(12) United States Patent
Dharmalingam

(10) Patent No.: US 8,543,619 B2
(45) Date of Patent: Sep. 24, 2013

(54) MERGING XML DOCUMENTS AUTOMATICALLY USING ATTRIBUTES BASED COMPARISON

(75) Inventor: Krishnamoorthy Dharmalingam, Tirupur (IN)

(73) Assignee: Oracle International Corporation, Redwood Shores, CA (US)

( * ) Notice: Subject to any disclaimer, the term of this patent is extended or adjusted under 35 U.S.C. 154(b) by 337 days.

(21) Appl. No.: 12/559,512

(22) Filed: Sep. 15, 2009

(65) Prior Publication Data

US 2011/0066626 A1 Mar. 17, 2011

(51) Int. Cl.
*G06F 17/30* (2006.01)

(52) U.S. Cl.
USPC .......................................... 707/803

(58) Field of Classification Search
USPC .......................................... 707/803
See application file for complete search history.

(56) References Cited

U.S. PATENT DOCUMENTS

| | | | |
|---|---|---|---|
| 6,507,856 B1 * | 1/2003 | Chen et al. | 715/205 |
| 6,772,165 B2 * | 8/2004 | O'Carroll | 1/1 |
| 7,058,645 B2 | 6/2006 | Seto et al. | |
| 7,185,277 B1 * | 2/2007 | Bernstein et al. | 715/210 |
| 7,287,216 B1 * | 10/2007 | Lee et al. | 715/234 |
| 2004/0225669 A1 | 11/2004 | Isaacson et al. | |
| 2005/0039119 A1 | 2/2005 | Parks et al. | |
| 2005/0198120 A1 | 9/2005 | Reshef et al. | |
| 2006/0053366 A1 * | 3/2006 | Abe et al. | 715/513 |
| 2006/0101073 A1 | 5/2006 | Popa et al. | |
| 2006/0218160 A1 * | 9/2006 | Bhatia | 707/100 |
| 2006/0235852 A1 | 10/2006 | Gaug | |
| 2006/0288276 A1 * | 12/2006 | Odagiri et al. | 715/513 |
| 2007/0100846 A1 | 5/2007 | King et al. | |
| 2007/0255750 A1 | 11/2007 | Goertz | |
| 2007/0294283 A1 * | 12/2007 | Mackay | 707/102 |
| 2008/0028332 A1 | 1/2008 | Perelman et al. | |
| 2008/0141114 A1 * | 6/2008 | Abe et al. | 715/234 |
| 2009/0043797 A1 * | 2/2009 | Dorie et al. | 707/101 |
| 2010/0088676 A1 * | 4/2010 | Yuan et al. | 717/120 |

OTHER PUBLICATIONS

"Tancred Lindholm", "A Three-Way Merge for XML Documents", Proceedings of the 2004 ACM symposium on Document engineering, Publication Date: Oct. 28-30, 2004, pp. 1-10.
"David Carlisle", "Merge Two Files", "http://www.dpawson.co.uk/xsl/sect2/merge.html", Copyright dated 1999-2007, Downloaded Circa: Nov. 5, 2008, pp. 1-4.

(Continued)

*Primary Examiner* — Joshua Bullock
(74) *Attorney, Agent, or Firm* — Narendra Reddy Thappeta

(57) ABSTRACT

An aspect of the present invention provides a technique to automatically merge information contained in two or more XML documents in to a single merged XML document. The merging technique is based on a comparison logic that involves comparing XML elements of one of the XML document with elements of the other XML document and this element comparison is based on at least one XML attribute associated with the elements of the XML documents and termed as a merge attribute in the embodiments of the invention. An aspect of the present invention involves parsing the XML documents and providing a list of attributes asscociated with the elements of the XML documents and allowing a user to select one or more attributes as merge attributes. In yet another embodiment the XML:ID-type is selected as the default merge attribute.

28 Claims, 14 Drawing Sheets

(56) References Cited

OTHER PUBLICATIONS

"Merging Forms in the Merge Forms Developer Sample Form", "http://msdn.microsoft.com/en-us/library/aa202691(office.11).aspx", Copyright dated 2008, Downloaded Circa: Nov. 5, 2008, pp. 1-1.

"Robin La Fontaine", "Merging XML Files: A New Approach Providing Intelligent Merge of XML Data Sets", Presented at XML Europe 2002, pp. 1-21.

"Jonathan Marsh, Daniel Veillard, Norman Walsh," "W3C Recommendation" http://www.w3.org/TR/xml-id/, Dated: Sep. 9, 2005, Downloaded Circa: Jul. 16, 2012, pp. 1-10.

\* cited by examiner

```
<?xml version="1.0" ?>
<catalog>
    <book id="bk101">
        <author>Gambardella, Matthew</author>
        <title>XML Developer's Guide</title>
        <genre>Computer</genre>
        <price>44.95</price>
    </book>
    <book id="bk102">
        <author>Ralls, Kim</author>
        <title>Midnight Rain</title>
        <genre>Fantasy</genre>
        <price>5.95</price>
    </book>
</catalog>
```

Book_simple1.xml+book_simple2.xml

```
<?xml version="1.0" ?>
<catalog>
    <book id="bk106">
        <author>Randall, Cynthia</author>
        <title>Lover Birds</title>
        <genre>Romance</genre>
        <price>4.95</price>
    </book>
    <book id="bk107">
        <author>Thurman, Paula</author>
        <title>Splish Splash</title>
        <genre>Romance</genre>
        <price>4.95</price>
    </book>
</catalog>
```

```
<?xml version="1.0" ?>
<catalog>
    <book id="bk101">
        <author>Gambardella, Matthew</author>
        <title>XML Developer's Guide</title>
        <genre>Computer</genre>
        <price>44.95</price>
    </book>
    <book id="bk102">
        <author>Ralls, Kim</author>
        <title>Midnight Rain</title>
        <genre>Fantasy</genre>
        <price>5.95</price>
    </book>
    <book id="bk106">
        <author>Randall, Cynthia</author>
        <title>Lover Birds</title>
        <genre>Romance</genre>
        <price>4.95</price>
    </book>
    <book id="bk107">
        <author>Thurman, Paula</author>
        <title>Splish Splash</title>
        <genre>Romance</genre>
        <price>4.95</price>
    </book>
</catalog>
```

FIG. 4A

```xml
<?xml version="1.0" ?>
<catalog>
<book id="bk101">
    <author>Gambardella, Matthew</author>
    <title>XML Developer's Guide</title>
    <genre>Computer</genre>
    <price>44.95</price>
</book>
<book id="bk102">
    <author>Ralls, Kim</author>
    <title>Midnight Rain</title>
    <genre>Fantasy</genre>
    <price>5.95</price>
</book>
</catalog>
```

Book_dup1.xml+book_dup2.xml

```xml
<?xml version="1.0" ?>
<catalog>
<book id="bk102">
    <author>Ralls, Kim</author>
    <title>Midnight Rain</title>
    <genre>Fantasy</genre>
    <price>5.95</price>
</book>
<book id="bk107">
    <author>Thurman, Paula</author>
    <title>Splish Splash</title>
    <genre>Romance</genre>
    <price>4.95</price>
</book>
</catalog>
```

```xml
<?xml version="1.0" ?>
<catalog>
<book id="bk101">
    <author>Gambardella, Matthew</author>
    <title>XML Developer's Guide</title>
    <genre>Computer</genre>
    <price>44.95</price>
</book>
<book id="bk102">
    <author>Ralls, Kim</author>
    <title>Midnight Rain</title>
    <genre>Fantasy</genre>
    <price>5.95</price>
</book>
<book id="bk107">
    <author>Thurman, Paula</author>
    <title>Splish Splash</title>
    <genre>Romance</genre>
    <price>4.95</price>
</book>
</catalog>
```

Merge property file ← 402
book=id

*FIG. 4B*

| Book_com1.xml | Book_com2.xml |
|---|---|
| <?xml version="1.0" ?><br><catalog><br>  <book id="bk101" author="Gambardella, Matthew"><br>    <price>44.95</price><br>  </book><br>  <book id="bk102" author="Randall, Cynthia"><br>    <price>4.95</price><br>  </book><br></catalog> | <?xml version="1.0" ?><br><catalog><br>  <book id="bk102" author="Ralls, Kim"><br>    <price>5.95</price><br>  </book><br>  <book id="bk107" author="Thurman, Paula"><br>    <price>4.95</price><br>  </book><br>  <book id="bk101" author="Gambardella, Matthew"><br>    <price>44.95</price><br>  </book><br></catalog> |

Merged Output File Book_com3.xml

<?xml version="1.0" ?>
<catalog>
  <book id="bk101" author="Gambardella, Matthew">
    <price>44.95</price>
  </book>
  <book id="bk102" author="Randall, Cynthia">
    <price>4.95</price>
  </book>
  <book id="bk107" author="Thurman, Paula">
    <price>4.95</price>
  </book>
</catalog>

Merge property file ← 406
book=id

*FIG. 4D*

Emp_child1.xml
```
<?xml version="1.0" ?>
<Organization xmlns="http://oracle.com/Organization">
    <Employees>
        <Employee EmployeeName="Alex" EmployeeID="emp1" Designation="MTS" DepartmentID="Development">
            <Address id="permanent">Santa Carlos , CA 94055</Address>
        </Employee>
        <Employee EmployeeName="John" EmployeeID="emp2" Designation="MTS" DepartmentID="Development" />
    </Employees>
</Organization>
```

Emp_child2.xml
```
<?xml version="1.0" ?>
<Organization xmlns="http://oracle.com/Organization">
    <Employees>
        <Employee EmployeeName="Alex" EmployeeID="emp1" Designation="MTS" DepartmentID="Development">
            <Address id="present">Redwood City , CA 94065</Address>
        </Employee>
    </Employees>
</Organization>
```

Merged Output Emp_child1.xml + Emp_child2.xml
```
<?xml version="1.0" encoding="UTF-8" ?>
<Organization xmlns="http://oracle.com/Organization">
    <Employees>
        <Employee EmployeeName="Alex" EmployeeID="emp1" Designation="MTS" DepartmentID="Development">
            <Address id="permanent">Santa Carlos , CA 94055</Address>
            <Address id="present">Redwood City , CA 94065</Address>
        </Employee>
        <Employee EmployeeName="John" EmployeeID="emp2" Designation="MTS" DepartmentID="Development" />
    </Employees>
</Organization>
```

Merge property file ← 408
Employee=EmployeeID
Address=id

*FIG. 4E* org1.xml
```
<?xml version="1.0" ?>
<Organization xmlns="http://oracle.com/Organization">
  <Departments>
    <Department DepartmentID="Development" DepartmentName="Development" />
    <Department DepartmentID="HR" DepartmentName="HR" />
  </Departments>
  <Employees>
    <Employee EmployeeName="Alex" EmployeeID="emp1" Designation="MTS" DepartmentID="Development" />
    <Employee EmployeeName="John" EmployeeID="emp2" Designation="MTS" DepartmentID="Development" />
  </Employees>
</Organization>
``` org2.xml
```
<?xml version="1.0" ?>
<Organization xmlns="http://oracle.com/Organization">
  <Departments>
    <Department DepartmentID="Development" DepartmentName="Development" />
    <Department DepartmentID="Sales" DepartmentName="Sales and Consulting" />
  </Departments>
  <Employees>
    <Employee EmployeeName="Krish" EmployeeID="emp3" Designation="MTS" DepartmentID="Sales" />
  </Employees>
</Organization>
```

Merged Output org1.xml + org2.xml
```
<?xml version="1.0" encoding="UTF-8" ?>
<Organization xmlns="http://oracle.com/Organization">
  <Departments>
    <Department DepartmentID="Development" DepartmentName="Development" />
    <Department DepartmentID="HR" DepartmentName="HR" />
    <Department DepartmentID="Sales" DepartmentName="Sales and Consulting" />
  </Departments>
  <Employees>
    <Employee EmployeeName="Alex" EmployeeID="emp1" Designation="MTS" DepartmentID="Development" />
    <Employee EmployeeName="John" EmployeeID="emp2" Designation="MTS" DepartmentID="Development" />
    <Employee EmployeeName="Krish" EmployeeID="emp3" Designation="MTS" DepartmentID="Sales" />
  </Employees>
</Organization>
```

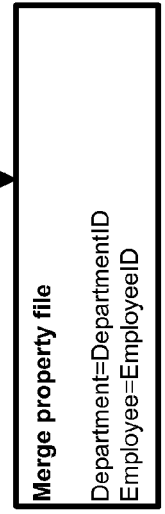

Merge property file — 410

Department=DepartmentID
Employee=EmployeeID

FIG. 4F

EmployeeList1.xml
<?xml version="1.0" ?>
<Organization xmlns="http://oracle.com/Organization">
  <Employees>
    <Employee EmployeeName="Alex" EmployeeID="emp1" Designation="MTS" DepartmentID="Development" />
    <Employee EmployeeName="John" EmployeeID="emp2" Designation="MTS" DepartmentID="Development" />
  </Employees>
</Organization>

EmployeeList2.xml
<?xml version="1.0" ?>
<Organization xmlns="http://oracle.com/Organization">
  <Employees>
    <Employee EmployeeName="Krish" EmployeeID="emp3" Designation="MTS" DepartmentID="Development" />
    <Employee EmployeeName="Jacob" EmployeeID="emp1" Designation="MTS" DepartmentID="Development" />
  </Employees>
</Organization>

Merged Output EmployeeList1.xml + EmployeeList2.xml
<?xml version="1.0" encoding="UTF-8" ?>
<Organization xmlns="http://oracle.com/Organization">
  <Employees>
    <Employee EmployeeName="Alex" EmployeeID="emp1" Designation="MTS" DepartmentID="Development" />
    <Employee EmployeeName="John" EmployeeID="emp2" Designation="MTS" DepartmentID="Development" />
    <Employee EmployeeName="Krish" EmployeeID="emp3" Designation="MTS" DepartmentID="Development" />
    <Employee EmployeeName="Jacob" EmployeeID="emp1" Designation="MTS" DepartmentID="Development" />
  </Employees>
</Organization>

Merge property file ← 412

Employee=EmployeeID, EmployeeName, DepartmentID
http://oracle.com/Organization+Employee=ID

*FIG. 4G*

Emp_guid1.xml
```
<?xml version="1.0" ?>
<Organization xmlns="http://oracle.com/Organization">
    <Employee EmployeeName="Jacob" EmployeeID="emp1" />
</Organization>
```

Emp_guid2.xml
```
<?xml version="1.0" ?>
<Organization xmlns="http://oracle.com/Organization">
    <Employee EmployeeName="Krish" EmployeeID="emp1" />
</Organization>
```

Merged Output Emp_guid1.xml + Emp_guid2.xml
```
<?xml version="1.0" encoding="UTF-8" ?>
<Organization xmlns="http://oracle.com/Organization">
    <Employee EmployeeName="Jacob" EmployeeID="emp1" />
    <Employee EmployeeName="Krish" EmployeeID="EmpID713270" />  ← 418
</Organization>
```

Merge property file — 416

Employee=EmployeeName

← 420

```
<?xml version="1.0" encoding="UTF-8" ?>
<schema targetNamespace="http://oracle.com/Organization"
    xmlns="http://www.w3.org/2001/XMLSchema"
    xmlns:org="http://oracle.com/Organization"
    elementFormDefault="qualified">
<element name="Organization">
    <complexType>
      <sequence>
       <element minOccurs="0" maxOccurs="unbounded"
       name="Employee" type="org:Employee" />
        <element minOccurs="0" maxOccurs="unbounded"
       name="Department" type="org:Department" />
        </sequence>
    </complexType>
</element>
<complexType name="Employee">
    <attribute name="EmployeeID" type="ID" use="required" />
    <attribute name="EmployeeName" type="org:non-empty-string" use="required" />
</complexType>
<complexType name="Department">
    <attribute name="DepartmentID" type="ID" use="required" />
    <attribute name="DepartmentName" type="org:non-empty-string" use="required" />
</complexType>
<simpleType name="non-empty-string">
    <restriction base="string">
        <minLength value="1" />
    </restriction>
</simpleType>
</schema>
```

*FIG. 4H*

Emp_xsd.xsd
```
<?xml version="1.0" encoding="UTF-8" ?>
<schema targetNamespace="http://oracle.com/Organization"
    xmlns="http://www.w3.org/2001/XMLSchema"
    xmlns:org="http://oracle.com/Organization"
    elementFormDefault="qualified">
<element name="Organization">
    <complexType>
        <sequence>
        <element minOccurs="0" maxOccurs="unbounded"
        name="Employee" type="org:Employee" />
         <element minOccurs="0" maxOccurs="unbounded"
        name="Department" type="org:Department" />
         </sequence>
     </complexType>
</element>
<complexType name="Employee">
    <attribute name="EmployeeID" type="ID" use="required" />
    <attribute name="EmployeeName" type="org:non-empty-string" use="required" />
</complexType>
<complexType name="Department">
    <attribute name="DepartmentID" type="ID" use="required" />
    <attribute name="DepartmentName" type="org:non-empty-string" use="required" />
</complexType>
<simpleType name="non-empty-string">
    <restriction base="string">
        <minLength value="1" />
    </restriction>
</simpleType>
</schema>
```

Emp_xsd1.xml
```
<?xml version="1.0" ?>
<Organization xmlns="http://oracle.com/Organization">
    <Department DepartmentID="HR" DepartmentName="HR" />
</Organization>
```

Emp_xsd2.xml
```
<?xml version="1.0" ?>
<Organization xmlns="http://oracle.com/Organization">
    <Employee EmployeeName="Krish" EmployeeID="emp1" />
    <Department DepartmentID="Sales" DepartmentName="Sales" />
</Organization>
```

422

Merge property file

Employee=EmployeeID
Department=DepartmentID

Emp_xsd1.xml + Emp_xsd2.xml
```
<?xml version="1.0" encoding="UTF-8" ?>
<Organization xmlns="http://oracle.com/Organization">
    <Employee EmployeeName="Krish" EmployeeID="EmpID340664" />
    <Department DepartmentID="HR" DepartmentName="HR" />
    <Department DepartmentID="DepID486933" DepartmentName="Sales" />
</Organization>
```

*FIG. 4I*

MERGING XML DOCUMENTS AUTOMATICALLY USING ATTRIBUTES BASED COMPARISON

BACKGROUND

1. Technical Field

The present disclosure relates to merging of XML documents and more specifically to merging of XML documents based on comparison of attributes associated with the elements of the XML documents.

2. Related Art

The widespread use of XML (Extensible Markup Language) technology for storing data in an enterprise and for exchanging data on the web necessitates efficient handling and manipulation of XML data. One well-known use of XML technology for information exchange exists in electronic business involving exchange of structured information such as bill of materials, purchase orders, invoices, etc between different business entities or organizations involved in business transactions, across the Internetwork. Often the information itself is stored as XML documents in the organization's information database. Whatever be the purpose of using XML technology, merging different XML documents often becomes necessary in order to consolidate data contained in the different XML documents into one single XML document for efficient use such as for transporting data across the network to another business entity. An example scenario with respect to the e-Business environment may involve merging of different XML documents containing information pertaining to bill of materials for a particular business transaction to generate a consolidated bill of materials for transporting to another business entity.

Merging two XML documents can be as simple as copying all the contents of both the XML documents into a single XML document. However, it may be desirable to merge the XML documents in a manner that accounts for the similarities and differences between the XML documents thereby generating a single merged XML document that does not include overlapping content and that adheres to the XML schema definitions (XSD) of the XML documents. A merging tool to generate such a merged output XML document from two or more input XML documents must be designed to resolve numerous conflicts in the input XML documents, such as duplicate elements in the input XML documents, duplicate elements but with revised content in one of the elements, conflicting elements at different positions in the input XML documents, different elements with matching element identifiers (ID-type attribute-xml:id/Version 1.0 W3C recommendation), etc. Merging without modifying the input XML documents, or without creating an XSLT (Extensible Stylesheet Language), and without much programming knowledge required of the user are additional desirable factors of a merging tool.

In addition to the specific e-Business environment described above, XML technology may be used for transporting data between any two computing systems thereby requiring consolidation of data from multiple XML documents into a single document for transport. In general, as well there is a need to consolidate data contained in several different XML documents for efficient storage in a database system. Given the widespread and popular use of XML technology for information storage and exchange, there is a general need for a robust merging technique that would automatically merge data contained in two or more XML documents into one single merged XML document.

BRIEF DESCRIPTION OF THE DRAWINGS

Example embodiments of the present invention will be described with reference to the accompanying drawings briefly described below.

FIGS. 4A-4I are example XML documents used to illustrate embodiments of the present invention.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Brief Introduction to XML

Figure 1:
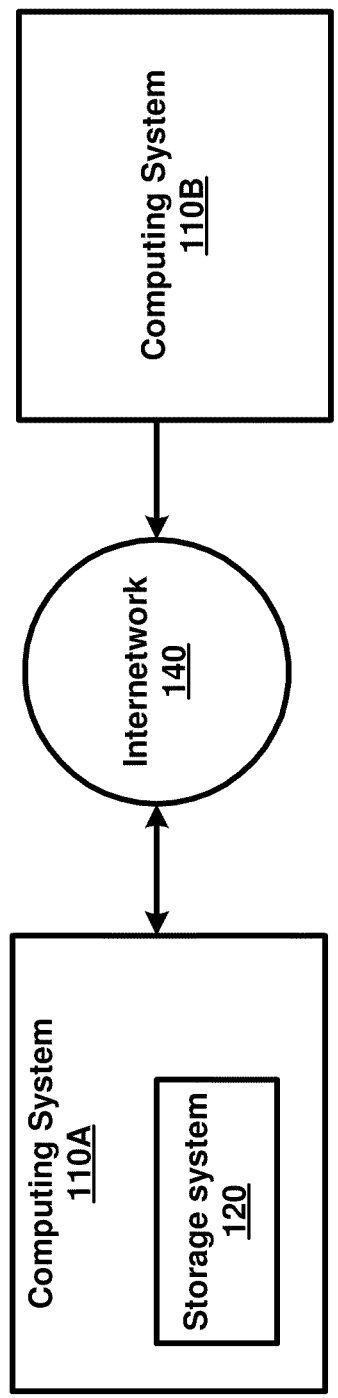
FIG. 1 is a block diagram illustrating an example environment (computing system) in which several aspects of the present invention can be implemented.

An XML document stores structured data formed from data (content) and markup on the data that provides information on the data itself. Markup data begins with the character "<" and ends with the character ">", for example, <book> where the string "book" is an XML tag is part of markup data. Any other data not included within the characters "<" ">" are content. The structure of the XML document enables a parser to determine which characters are part of the document's markup and which are part of the document's data or content. The following paragraph provides a description of some of the terminology used throughout the document with reference to FIGS. 4A-4I.

XML tags are paired as start-tags and end-tags that are distinguished from each other using special characters but have matching text. The start-tag is included within the characters "<" ">" and the end-tag is included within the characters "</" ">". For example, in FIG. 4A <catalog>, </catalog> and <book>, </book> are each pairs of start-tags and end-tags.

Information from the start of a start-tag to the end of the end-tag and including everything in between is an element. For example, in FIG. 4A "catalog" is an element that starts from the tag <catalog> and ends at the end of the tag </catalog>, "book" is another element that starts from the tag <book> and ends at the end of the tag </book>, and "author" is also another element that starts from the tag <author> and ends at the end of the tag </author>. The XML tags of an element are also referred to as the local name of the element in the XML document.

Elements can be nested that is an element can contain another element or sub-elements providing a hierarchy to the elements structure. The relationship between the elements in the hierarchy determines their parent-child relationship. For example, in FIG. 4A the element "catalog" contains a sub-element "book" and hence "book" is the child of the parent "catalog" element. The element at the highest level in the hierarchy such as the "catalog" element is the root element.

Elements may have text content (Parsed Character Data-PCDATA) such as text nodes. For example, in FIG. 4A the element "author" (child of element "book") includes only text content "Gambardella, Matthew" and is referred to as text content of the element "book" through out the document.

Elements may have an associated attribute, which is a name-value pair. For example, in FIG. 4E, the element "Employee" (child of element "Employees") has an associated attribute with name "EmployeeName" and value "Alex" where the value is included within double quotes. The element "Employee" has another associated attribute "EmployeeID". The element "Address" (child of element "Employee") also has an associated attribute named "id" with value "permanent".

Attributes with the string "id" in the name of the attribute have been referred to as ID-type attribute in the document. In XML, ID-type attributes are used to uniquely define the element they are associated with in the XML document. (ID-type attribute-xml:id/ Version 1.0 W3C recommendation)

Within the context of the embodiments of the present invention, a merge attribute is an attribute associated with an element based on which two elements are compared in the comparison operation. Two elements from two different XML documents can be compared when they their local names are equal and when each of the elements has the same associated merge attribute. The two elements being compared are said to be matching when the values of their merge attributes are equal.

Within the context of the embodiments of the present invention, two elements from two XML documents are referred to as duplicate elements when the content of the elements from the start of the start-tag to the end of the end-tag are equal. For example, in FIG. 4B, the elements "book" in the Book_dup1.xml and Book_dup2.xml with an associated attribute id="102" have equal content and hence are duplicate elements.

Within the context of the embodiments of the present invention, two elements from two different XML documents are said to be in conflict when the two elements have overlapping content with respect to attributes, which are expected to have unique values. For example, as described above, in FIG. 4B the duplicate elements, "book" in Book_dup1.xml and "book" in Book_dup2.xml with associated attribute id="102" have overlapping content and therefore are in conflict. Two non-matching elements having an overlap in their ID-type attribute values are also conflicting elements.

The conflict in two conflicting elements needs to be resolved while merging the two elements. Resolving a conflict requires identifying and performing appropriate actions that enable copying the conflicting elements to the merged XML document without overlapping content with respect to attributes that are expected to have unique values in the final merged element(s). For example, conflicts arising from merging duplicate elements may be resolved by inserting only one of the duplicate elements to the merged XML document. Conflicts arising from non-matching elements having duplicate ID-type attribute may be resolved by generating a unique identifier and replacing the value of the ID-type attribute for one of the conflicting elements with the unique identifier.

2. Overview

An aspect of the present invention provides a technique to automatically merge data contained in two or more XML documents in to a single merged XML document. The merging technique is based on a comparison logic that involves comparing XML elements (hereafter elements) of one of the XML documents with elements of the other XML document and this element comparison is based on at least one XML attribute (hereafter attribute) associated with the elements of the XML document. This at least one attribute used for comparison of the elements is termed in embodiments of the present invention as merge attribute. An aspect of the present invention involves parsing the XML documents and providing a list of attributes asscociated with the elements of the XML documents and allowing a user to select one or more attributes as merge attributes. In yet another embodiment the ID-type attribute is selected as the default merge attribute.

The merging technique of the present invention generates a merged output XML document containing data elements from both the input XML documents. The merging technique of the present invention resolves conflicts in the input XML documents such that the merged output XML document contains one and only one copy of duplicate or overlapping elements, if any, present in the input XML documents. As described earlier, an element may have associated attributes, and child elements. Further, the child elements may have an associated attribute or may have text content (Parsed Character Data PCDATA. The merging technique of the present invention merges two elements, from the two input XML documents, along with all the attributes, and child elements of the two elements. According to an embodiment of the present invention the two elements, having an associated merge attribute, are first compared according to the comparison logic of the present invention. The two elements are said to match when their respective values for the merge attribute are equal. If the two elements are found to match then the other attributes of the matching elements and child elements of the matching elements are also compared. The comparison and merging technique of the child elements with associated attribute is similar to that of their matching (parent) elements. Whereas, the other attributes and text content of the matching elements are string compared to determine whether they are equal. When the other attributes, text content and child elements of the matching elements also match or are equal then the two XML elements are said to be duplicates of each other. The merged output XML document contains only one copy of such duplicate elements. The merging technique of the present invention also resolves conflicts arising when matching (parent) elements have unequal child elements. For example, when the text content of the matching elements are unequal the merge utility 220 (of FIG. 2) selects one element from the pair of matching elements and the text content of the selected element is copied to the merged output XML document. This selection is done based on the value of a replace flag that has a default value or is set by a user. Additionally, the merging technique of the present invention resolves conflicts arising from merging elements with old content with that of its revised version, from merging non-matching elements with equal ID-type attribute values, from merging elements belonging to different XML namespaces, etc. The merging technique of the present invention is also capable of generating a merged output XML document that adheres to XSD of the input XML documents. Each of the above conflicts and the manner in which the merging technique resolves the conflict is illustrated in the examples of FIGS. 4A-4I as described in the later portion of the document.

Another embodiment of the present invention compares two or more input XML documents providing information on similarities or differences between the input XML documents. One or more events are generated corresponding to the results of the comparison of the elements of the input XML documents.

According to another embodiment of the present invention application programming interfaces (API) are provided for comparing two or more XML documents, and for merging two or more XML documents and such API's may be called by a requesting system to initiate a comparison operation or a merge operation for two or more XML documents.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

3. Example Environment

FIG. 1 is a block diagram illustrating an example environment in which several aspects of the present invention can be implemented. The block diagram is shown containing computing systems 110A and 110B, storage system 120, and Internetwork 140.

Computing system 110A may represent a computer having a processor, a memory, capable of executing software programs and capable of communicating with other systems across the Internetwork 140. According to example embodiments of the present invention, such as in an electronic business environment, or in a client-server environment, the computing system 110A may be a server, such as a web/application server, capable of executing enterprise applications or software programs such as corresponding to an implementation of an embodiment of the present invention, and capable of performing tasks requested by other systems such as from computing system 110B, across the Internetwork 140. The computing system 110A may perform the tasks on data maintained internally in the storage system 120 or on external data and then send the result of performance of the tasks to the requesting computing system 110B. The computing system 110A may also contain other software programs such as operating system, device drivers, etc., (not shown) that provide a (common) run time environment facilitating the execution of the enterprise applications.

Internetwork 140 represents a network providing connectivity between computing systems 110A and 110B. Internetwork 140 may represent an Internet or an Intranet and may be implemented using protocols such as Internet Protocol (IP) well known in the relevant arts. In general, in IP environments, an IP packet is used as a basic unit of transport, with the source address being set to the IP address of the source system from which the packet originates and the destination address set to the IP address of the target system to which the packet is to be eventually delivered.

Computing system 110B may represent a computer having a processor, a memory, capable of executing software programs and capable of communicating with other systems across the Internetwork 140. According to an example embodiment of the present invention, such as in an electronic business environment, the computing system 110B represents a server, such as a web/application server, capable of executing enterprise applications. According to another example embodiment of the present invention, such as in a client-server environment, the computing system 110B may represent a client system such as a personal computer, a workstation, a mobile station, capable of communicating with the computing system 110A. The computing system 110B, in general, is capable of generating a request to perform a task to applications executing on the computing system 110A and receive corresponding responses containing the results of the performance of the requested task. In addition, the computing system 110B may also provide an interface for receiving inputs from the user of the computing system 110B. The computing system 110B may also contain other software programs such as operating system, device drivers, etc., (not shown) that provide a (common) run time environment facilitating the execution of the enterprise applications.

Merely for illustration, only representative number/type of systems is shown in the FIG. 1. The system such as described in FIG. 1 is one environment in which the present invention may be operative. The system described in FIG. 1 according to a typical electronic business environment may comprise of two computing systems 110A and 110B communicating over the Internetwork 140, each computing system executing enterprise or business applications wherein computing system 110A may be a supplier business entity and computing system 110B may be a consumer business entity with information in the form of XML documents flowing from computing system 110A to computing system 110B.

According to a typical client-server environment, FIG. 1 comprises computing system 110A and computing system 110B with computing system 110A representing a server capable of executing applications such as that corresponding to an embodiment of the present invention, receiving requests from computing system 110B, and generating corresponding responses for the computing system 110B. The present invention may also be operative in other environments containing many more systems, both in number and type, depending on the purpose for which the environment is designed.

4. Merging Two XML Documents

Figure 2:
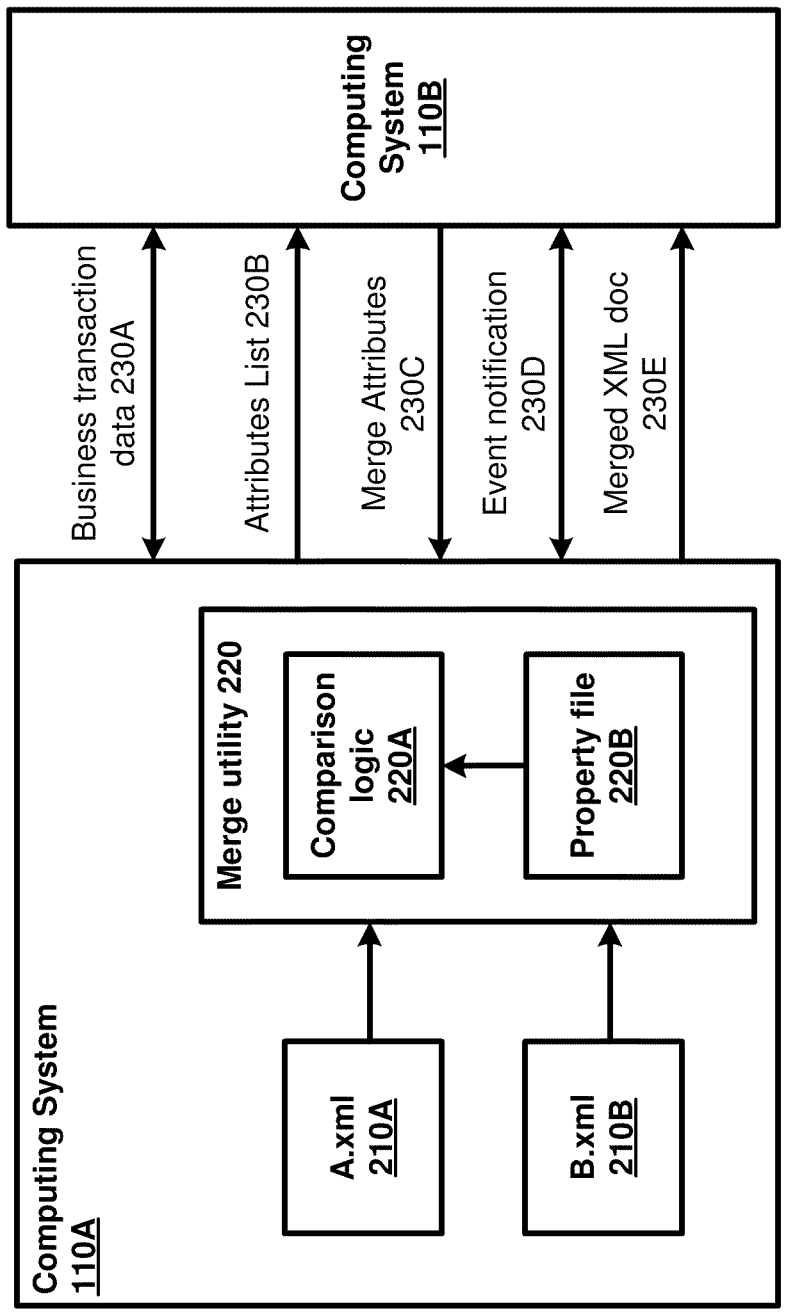
FIG. 2 is a block diagram representation of the embodiment of the present invention for merging two XML documents.

FIG. 2 is a block diagram representation of the operation of an embodiment of the present invention that merges data contained in two or more XML documents in to one merged XML document.

Computing systems 110A and 110B, XML documents A.xml 210A and B.xml 210B, and business transaction related data 230A are part of an example system corresponding to an electronic business environment in which, the embodiment of the present invention is operable. In general computing systems 110A and 110B may be any two systems exchanging data over the Internetwork 140. In the typical environment described earlier, computing system 110A and computing system 110B may be equivalent to business entities engaged in business transactions and exchanging associated data shown as business transaction 230A in FIG. 2. In a particular phase of the business transaction computing system 110A may be supplying data stored in its storage system 120 such as bill materials, a catalog of products, or a catalog of books. Typically, such data may be stored in more than one file and in one of several different formats including XML format. FIG. 2 shows two such documents A.xml 210A and B.xml 210B containing the data to be sent to the receiving computing system 110B. For data stored in a format other than XML format such as PDF (Portable Document Format), well-known tools and techniques are available to convert PDF documents to XML.

An embodiment of the present invention provides a technique to merge data contained in the two XML documents A.xml 210A and B.xml 210B into a single merged XML document for sending to the computing system 110B. Merge utility 220, comparison logic 220A, property file 220B, attributes list 230B, merge attributes 230C, event notification 230D, and merged XML document 230E are part of the embodiment of the present invention that generates a single merged XML document. Although, merged XML document 230E has been shown distinct from the business transaction data 230A, merged XML document 230E may be sent from computing system 110A to computing system 110B as part of the business transaction data 230A.

The computing system 110A includes a merge utility 220 that includes a comparison logic 220A for merging two input XML documents A.xml and B.xml (210A and 210B) and generates a single merged XML document. An embodiment of the present invention parses the input XML documents using standard parser implementations such as the XML Document Object Model (DOM) parser implementations that offer various standard interfaces for accessing and manipulating the documents. For example, the NamedNodeMap interface (W3C core specifications for Document Object Model—http://www.w3.org/TR/DOM-Level-2-Core/) may be used to get a list of attributes associated with each element of the two input XML documents. Additionally, standard DOM interfaces may be used to identify a list of all elements including the root elements, and child elements, get the local name of an element, get the value of an attribute, get the namespace URI of the element.

Alternatively, the above information may be derived using standard DOM interfaces from the XSD of the input XML documents, if the XSD is available. The attributes list 230B that includes the list of attributes associated with each element of the XML document is sent to the requesting computing system 110B. The requesting computing system 110B enables a user of the computing system 110B to select one or more attributes from the attributes list 230B as merge attributes, and sends back the selected merge attributes 230C to the computing system 110A. The merge attribute 230C is stored in a merge property file 220B as a key-value pair for each type of element. For example, for an Employee element having an associated EmployeeName attribute selected as the merge attribute, the merge property file 220B stores the merge attribute as shown below:

Employee=EmployeeName

If more than one attribute is selected as merge attribute then the property file 220B lists all the merge attributes as for that element:

Employee=EmployeeDepartment, EmployeeName

The merge utility 220 accesses the merge property file 220B to identify the merge attributes defined by the user for use by the comparison logic 220A. According to another embodiment of the present invention if the merge property file 220B is empty then the merge utility 220 uses the ID-type attribute as the default merge attribute. The ID-type attribute may be identified for example, using DOM interfaces to identify attributes with the string "ID" in the attribute name. The comparison logic 220A compares elements of A.xml 210A with elements of B.xml 210B based on the merge attributes. Two elements are said to be matching when their merge attributes are equal in value. Based on such a comparison if the two elements are identified as matching then the comparison logic 220A also compares other attributes, text content and child elements of the matching elements.

According to an example embodiment of the present invention the element comparison includes a string-based comparison of the element contents of the input XML documents. The comparison logic is capable of identifying any duplicate elements and other conflicts in the input XML documents that serves as an essential input for the merge utility 220. The merge utility 220 resolves such conflicts and accordingly initiates the merging operation. The merging operation initiates copy of contents of B.xml 210B into A.xml 210A resulting into a single output merged XML document 230E that contains contents of both A.xml 210A and B.xml 210B as resolved by the merge utility 220. According to another embodiment of the present invention the contents of the input XML documents A.xml and B.xml (210A and 210B) may be merged into a third output XML document. The merge utility 220 is also capable of merging two input XML documents based on multiple merge attributes as defined in the property file 220B, or based on different merge attributes configured for different elements in the property file 220B.

According to another embodiment of the present invention the comparison logic 220A may generate several events such as event notification 230D corresponding to the result of comparison of the elements of the XML documents and prior to initiating the merge operation.

The operation of the merge utility 220 and the comparison logic 220A are described in detail in the following paragraphs using relevant examples with respect to FIGS. 3A-3B and 4A-4I. Several conflicting scenarios and the corresponding technique for merging become evident from the examples illustrated in FIGS. 4A-4I.

Figure 3A:
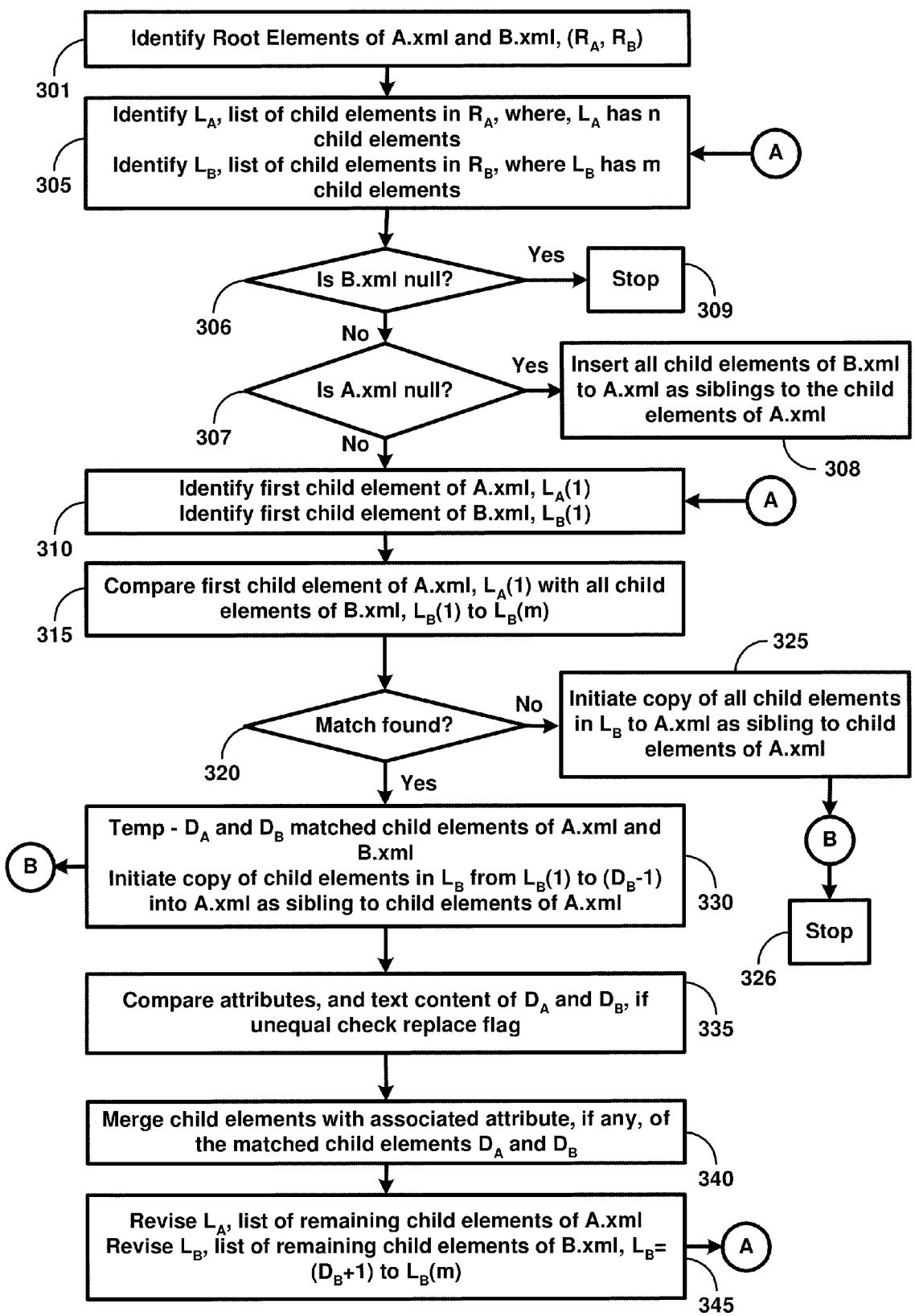
FIGS. 3A-3B are flowcharts illustrating the comparison logic and merging operation used to merge data from two XML documents into a single XML document according to an embodiment of the present invention.
Figure 3B:
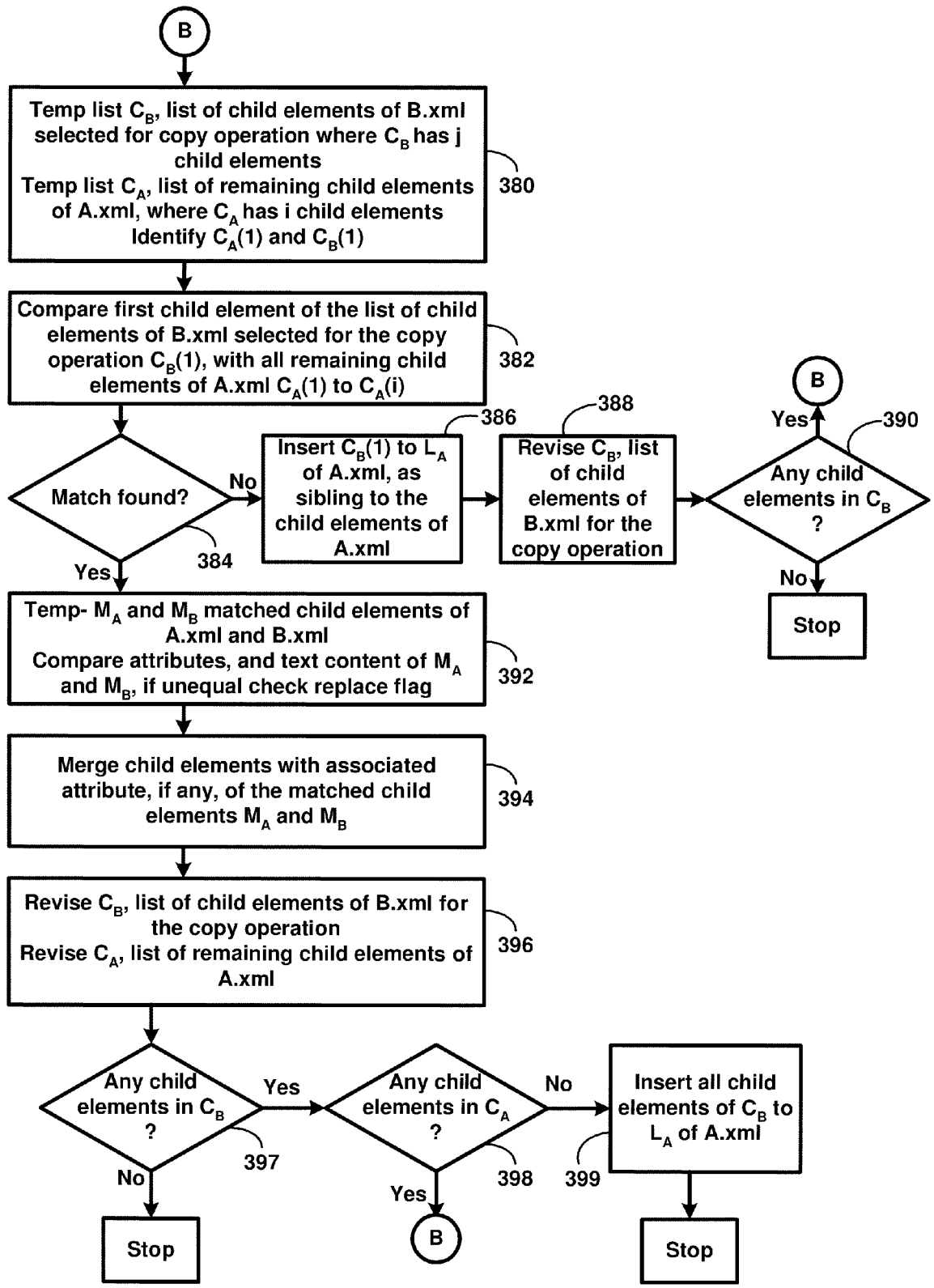

FIGS. 3A-3B are flowcharts illustrating the comparison logic 220A for comparing the elements of A.xml with the elements of B.xml and the resulting merging operation according to an embodiment of the present invention. The comparison logic of FIGS. 3A-3B envisages different conflicting scenarios and the corresponding manner in which the merge utility 220 resolves the conflicts and merges the two XML documents according to the embodiment of the present invention. Each scenario has been explained in below paragraphs using example input XML documents corresponding to A.xml and B.xml (210A and 210B respectively) illustrated in FIGS. 4A-4I. The comparison logic of FIGS. 3A-3B is applicable only when the root elements of the two XML documents are equal. Further, the comparison logic of FIGS. 3A-3B, before initiating comparison of any two elements from two XML documents ensures whether the elements being compared are derived from the same type of element. This can be ensured by a string compare of the local name of the two elements in comparison or by ensuring that the two elements belong to the same XML Namespace. If the local name or the XML tags of the two elements being compared are not equal then the comparison of the elements is ignored.

5. Merging Non-Conflicting XML Documents

FIG. 4A with input XML documents Book_simple1.xml and Book_simple2.xml being equivalent to A.xml and B.xml (210A and 210B) respectively, illustrates two non-conflicting input XML documents that do not have any duplicate elements. Book_simple1.xml and Book_simple2.xml are merged according to the comparison logic and merging operation illustrated in the flowcharts of FIGS. 3A-3B. For this example, it is assumed that no merge property file 220B is available and hence according to an embodiment of the present invention the ID-type attribute is the default merge attribute.

According to block 301 of the flowchart of FIG. 3A, the root elements $R_A$ and $R_B$ of the input XML documents A.xml and B.xml (210A and 210B) respectively, are identified. At block 305 the list of child elements of the root elements $R_A$ and $R_B$ are identified and stored in lists $L_A$ and $L_B$ respectively, where $L_A$ has child elements 1 to 'n' and $L_B$ has child elements 1 to 'm'. Since the comparison logic of FIGS. 3A-3B is applicable only when the input XML documents have common root elements, block 301 also determines whether $R_A=R_B$. If the root elements are unequal the flowchart ends. With respect to Book_simple1.xml and Book_simple2.xml the root elements $R_A$ and $R_B$ are "catalog" and are equal and the comparison logic of FIGS. 3A-3B may be applied. At block 305 of the flowchart of FIG. 3A the list of child elements, $L_A$ and $L_B$ of the root elements $R_A$ and $R_B$ are identified. The list $L_A$ contains two "book" child elements, $L_A$(book id="bk101", book id="bk102") where, first book child element $L_A(1)$ has an associated attribute id="bk101" and second book child element $L_A(2)$ has an associated attribute id="bk102". The list $L_B$ also contains two "book" child elements, $L_B$(book id="bk106", book id="bk107") where, first book child element $L_B(1)$ has an associated attribute id="bk106" and another book child element $L_B(2)$ has an associated attribute id="bk107".

Block 306 of FIG. 3A checks whether there are any child elements in B.xml, i.e., if list $L_B$ is null. If $L_B$ is null or there are no child elements in B.xml the flowchart ends at block 309 otherwise control progresses to block 307.

Block 307 of FIG. 3A checks whether there are any child elements in A.xml, i.e., if list $L_A$ is null. If $L_A$ is null or there are no more child elements in A.xml the flowchart progresses to block 308. Block 308 inserts all the child elements in the list $L_B$ to the list $L_A$ as sibling to the child elements in $L_A$ i.e., at the hierarchical level of the child elements of $L_A$. This is equivalent to adding all the child elements of B.xml to A.xml as sibling to child elements of A.xml. All the attributes, text content, and child elements of the child elements in the list $L_B$ are also copied to A.xml. The merged output XML will include all the elements in the list $L_A$. If $L_A$ is not null the control progresses to block 310.

At block 310 of the flowchart of FIG. 3A, the first child elements $L_A(1)$ and $L_B(1)$ of each of the input XML documents is identified. With respect to the FIG. 4A, the first child element of Book_simple1.xml $L_A(1)$ is "book" with an associated attribute id="bk101" and the first child element of Book_simple2.xml $L_B(1)$ is "book" with an associated attribute id="bk106".

At block 315 of the flowchart of FIG. 3A, the first child element of Book_simple1.xml is compared with all the child elements of Book_simple2.xml starting from the first child element of Book2.xml. Accordingly, $L_A(1)$ is compared with each child element in the $L_B$ list starting from $L_B(1)$ up to the last element $L_B(m)$ or until a match is found. This comparison of the child elements of Book_simple1.xml with the child elements of Book_simple2.xml is done based on the merge attribute and the two child elements being compared are said to match when their merge attribute values are equal. Before initiating comparison of any two elements, block 315 ensures that the local names of the elements being compared are equal and thereby are the same type of elements. For example, with respect to FIG. 4A, the XML tags of $L_A(1)$ and $L_B(1)$ are <book> and therefore are of the same type and can be considered for comparison. However, if the XML tags of the elements being compared are not equal then the comparison of the values of the merge attribute of those elements is ignored and block 315 initiates comparison of the next set of elements in the lists. With respect to FIG. 4A, the merge attribute is the ID-type attribute and to compare the first child element of Book_simple1.xml with the child elements of Book_simple2.xml the values of their ID-type attribute are compared. For example, the value of the merge attribute of the child element $L_A(1)$, book id="bk101", is first compared with the value of the merge attribute of the child element $L_B(1)$, book id="bk106", and then with the value of the merge attribute of the child element $L_B(2)$.

Block 320 of the flowchart of FIG. 3A determines whether any of the child elements of Book_simple2.xml in the list $L_B$, with their associated ID-type attribute matches with the first child element $L_A(1)$, of Book1.xml. With respect to FIG. 4A, the first child element $L_A(1)$, book id="bk101" of Book_simple1.xml is compared with the child elements, $L_B(1)$ and $L_B(2)$ i.e., book id="bk106" and book id="bk107" of Book_simple2.xml. Since none of the child elements of Book_simple2.xml in the list $L_B$ have any ID-type attribute with value equal to "bk101" no match is found. The flowchart of FIG. 3A progresses to block 325.

Block 325 initiates a copy operation of all the child elements of B.xml in the list $L_B$ to the list $L_A$ of A.xml as siblings to the child elements of A.xml. With respect to FIG. 4A, since none of the child elements in the list $L_B$ of Book_simple2.xml match the first child element $L_A(1)$ of A.xml, all the child elements in the list $L_B$ (book id="bk106", book id="bk107"), are considered for the copy operation. The control moves to connector B of FIG. 3B with information on the list of child elements of Book_simple2.xml selected for the copy operation namely, $L_B(1)$ and $L_B(2)$, and the list of remaining child elements of Book_simple1.xml namely, $L_A(2)$ to $L_A(n)$. Before actually copying the child elements of Book_simple2.xml to Book_simple1.xml, the copy operation performs a set of comparisons of the child elements of Book_simple2.xml selected for the copy operation with the child elements of Book_simple1.xml namely, $L_A(2)$ to $L_A(n)$. FIG. 3B illustrates the copy operation in detail.

6. Copy Operation

At block 380 of the flowchart of FIG. 3B, the list of child elements of B.xml selected for the copy operation are stored in a temporary list $C_B$ and the list of remaining child elements of A.xml are stored in a temporary list $C_A$ where, $C_B$ has child elements 1 to 'y and $C_A$ has child elements 1 to T. With respect to FIG. 4A, the list of child elements of Book_simple2.xml selected for the copy operation is stored in $C_B$ and the list of remaining child elements of Book_simple1.xml, is stored in the list $C_A$. Therefore, $C_B$ contains (book id="bk106", book id="bk107"), and $C_A$ contains (book id="bk102"). Accordingly, the first child element from the list of child elements of Book_simple2.xml selected for the copy operation $C_B(1)$ is "book" with an associated attribute id="bk106" and the first child element from the list of remaining child elements of Book_simple1.xml $C_A(1)$ is "book" with an associated attribute id="bk102".

At block 382 of the flowchart of FIG. 3B, $C_B(1)$ of B.xml is compared with all the child elements of $C_A$ of A.xml starting from the first child element $C_A(1)$ to the last child element $C_A(i)$ or until a match is found. As described earlier, any comparison operation begins only after ensuring that the elements being compared are the same type of elements. With respect to FIG. 4A, the book id="bk106" of Book_simple2.xml is compared with book id="bk102" of Book_simple1.xml. Since the values of the ID-type attributes of the two child elements are not equal, the two child elements do not match and hence the control progresses to block 386.

At block 386 of the flowchart of FIG. 3B, the first child element $C_B(1)$ of B.xml is appended to the list $L_A$ of A.xml. In other words, $C_B(1)$ is inserted along with all its attributes, text content, and child elements as a sibling to the child elements of A.xml. With respect to FIG. 4A, $C_B(1)$ book id="bk106", of Book_simple2.xml is inserted as a sibling to book id="bk102" of Book_simple1.xml. Accordingly, the updated list $L_A$ contains (book id="bk101", book id="bk102", book id="bk106".)

The flowchart moves to block 388 to revise $C_B$, the list of child elements of B.xml selected for the copy operation to include only those child elements of B.xml remaining to be copied to A.xml in the copy operation. Accordingly, with respect to FIG. 4A, the revised list $C_B$ contains only book id="bk107". Block 390 of the flowchart of FIG. 3B determines whether there are any more child elements in the list $C_B$ and if yes, the control flows back to block 380 and if not, the flowchart ends. The list of remaining child elements of Book_simple1.xml remains the same.

With respect to FIG. 4A, blocks 380 and 382 are now executed with revised list $C_B$ of Book_simple2.xml to be copied in the copy operation and accordingly the first child element of $C_B$ of Book_simple2.xml is book id="bk107" and the list of remaining child elements $C_A$ of Book_simple1.xml is book id="bk102". Since the two child elements book id="bk107", and book id="bk102" do not match, at block 386, book id="bk107" is appended to the list $L_A$ of A.xml. The child element book id="bk107" along with all its attributes, text content and child elements is inserted in the list $L_A$ of Book_simple1.xml as sibling to the child elements of Book_simple1.xml. The updated list $L_A$ of Book_simple1.xml now includes (book id="bk101", book id="bk102", book id="bk106", book id="bk107"). At blocks 388 and 390 it is determined that there are no more child element in the list $C_B$ of Book_simple2.xml and the flowchart ends.

FIG. 4A shows the merged output document Book_simple1.xml+Book_simple2.xml containing all the elements as in the updated list $L_A$.

7. Merging XML Documents with Duplicate Elements

FIG. 4B with input XML documents Book_dup1.xml and Book_dup2.xml being equivalent to A.xml and B.xml (210A and 210B) respectively, illustrate two conflicting input XML documents that have duplicate elements, i.e., elements that have attributes with equal values, matching text content and matching child elements. Book_dup1.xml and Book_dup2.xml are merged according to the comparison logic and merging operation illustrated in FIGS. 3A-3B. For this example, a merge property file 220B the contents of which are marked as 402 in FIG. 4B is used. According to the merge property file 402 the merge attribute for the child element named "book" is the "id" attribute.

As discussed above with respect to FIG. 4A, in blocks 301 and 305 of the flowchart of FIG. 3A, the root elements $R_A$ and $R_B$ and their list of child elements $L_A$ and $L_B$ of the input XML documents A.xml and B.xml (210A and 210B) respectively, are identified. With respect to FIG. 4B, $R_A$ and $R_B$ for Book_dup1.xml and Book_dup2.xml are identified as "catalog". The list $L_A$ of child elements of Book_dup1.xml contains two "book" child elements, $L_A$(book id="bk101", book id="bk102") where, first book child element $L_A(1)$ has an associated attribute id="bk101" and second book child element $L_A(2)$ has an associated attribute id="102". The list $L_B$ of child elements of Book_dup2.xml also contains two "book" child elements, $L_B$(book id="bk102", book id="bk107") where, first book child element $L_B(1)$ has an associated attribute id="bk102" and second book child element $L_B(2)$ has an associated attribute id="107".

Block 306 of FIG. 3A checks whether there are any child elements in B.xml, or if list $L_B$ is null. If there are no more child elements in the list $L_B$ of B.xml the flowchart ends at block 309 otherwise control progresses to block 307.

Block 307 of FIG. 3A checks whether there are any child elements in the list $L_A$ of A.xml. If the list $L_A$ is empty the flowchart progresses to block 308 that inserts all the child elements of B.xml and all its attributes, text content and child elements, to A.xml as sibling to child elements of A.xml, in other words, all the child elements in the list $L_B$ are appended to the list $L_A$. If the list $L_A$ is not empty the control progresses to block 310.

At block 310 of the flowchart of FIG. 3A, the first child elements $L_A(1)$ and $L_B(1)$ of A.xml and B.xml respectively, are identified. With respect to the FIG. 4B, $L_A(1)$ of Book_dup1.xml is "book" with an associated attribute id ="bk101" and $L_B(1)$ of Book_dup2.xml is "book" with an associated attribute id ="bk102".

At block 315 of the flowchart of FIG. 3A, the first child element of Book_dup1.xml is compared with the child elements of Book_dup2.xml starting from the first child element of Book_dup2.xml. The child element comparison of the Book_dup1.xml and Book_dup2.xml is done based on the merge attribute 402 according to which the "id" attribute associated with the element "book" is the merge attribute. Accordingly, $L_A(1)$ of Book_dup1.xml i.e., book id="bk101" is compared with all the child elements in the list $L_B$ of Book_dup2.xml starting from $L_B(1)$ up to the last element $L_B$(m) or until a match is found.

Block 320 of the flowchart of FIG. 3A determines whether any of the child elements of Book_dup2.xml with their associated ID-type attribute matches with the first child element $L_A(1)$, of Book_dup1.xml. With respect to FIG. 4B, the child element $L_A(1)$, book id="bk101" of Book_dup1.xml is compared with the child elements $L_B(1)$ and $L_B(2)$ i.e., book id="bk102" and book id="bk107" of Book_dup2.xml. Since none of the child elements of Book_dup2.xml have any ID-type attribute with value equal to "bk101" no match is found. The flowchart of FIG. 3A progresses to block 325.

Block 325 initiates a copy operation of all the child elements in the list $L_B$ of Book_dup2.xml to the list $L_A$ of Book_dup1.xml. as sibling to the child elements of Book_dup1.xml. With respect to FIG. 4B, all the child elements in the list $L_B$ (book id="bk102", book id="bk107"), are considered for the copy operation. The control moves to connector B of FIG. 3B with information on the list of child elements of Book_dup2.xml selected for the copy operation namely, $L_B(1)$ and $L_B(2)$, and the list of remaining child elements of Book_dup1.xml namely, $L_A(2)$ to $L_A$(n). FIG. 3B illustrates the copy operation.

8. Copy Operation

At block 380 of the flowchart of FIG. 3B, the list of child elements of Book_dup2.xml selected for the copy operation is stored in list $C_B$ and the list of remaining child elements of Book_dup1.xml, is stored in the list $C_A$. Accordingly, $C_B$ contains (book id="bk102", book id="bk107"), and $C_A$ contains (book id="bk102"). From the lists $C_A$ and $C_B$ the first child element from the list of child elements of Book_dup2.xml selected for the copy operation $C_B(1)$ is "book" with an associated attribute id="bk102" and the first child element from the list of remaining child elements of Book_dup1.xml $C_A(1)$ is "book" with an associated attribute id="bk102".

At block 382 of the flowchart of FIG. 3B, the first child element $C_B(1)$, book id="bk102" of Book_dup2.xml is compared with all the child elements in the list $C_A$ of Book_dup1.xml starting from the first child element $C_A(1)$ to the last child element $C_A$(i). The list $C_A$ contains only one child element and therefore, $C_B(1)$ is compared with $C_A(1)$. Since the values of the id attribute, the merge attribute 402, of $C_B(1)$ and $C_A(1)$ are equal (id="bk102"), a match is found in block 384 and the control progresses to block 392. For the sake of convenience, the matching child elements $C_B(1)$ and $C_A(1)$ are temporarily denoted as $M_A$ and $M_B$ respectively, where $M_A = M_B$.

At block 392 of the flowchart of FIG. 3B, all the attributes (other than the merge attribute) and text content of the matching child elements of A.xml and B.xml are compared. (Other child elements with associated attribute, if any, of the first child element of B.xml are merged at block 394). This comparison is a string comparison of the additional attributes and the text content of the matching child elements of the two XML documents. If any of the additional attributes or text content is not equal then based on the value of a replace flag one child element from the pair of matching child elements is selected. The attributes and text content of the selected child element is copied to the merged output XML. The replace flag may be set by the user of the computing system 110B or may be set as default to "true". If the replace flag is "false" then the additional attributes and text content of the matching child element of A.xml is retained otherwise the additional attributes and text content of the matched child element of B.xml will be copied to replace those of the matching child element of A.xml. There are no additional attributes in the matching child elements $M_A$ and $M_B$ of the two XML documents of FIG. 4B and their text content are equal thereby leaving $M_A$ of Book_dup1.xml unchanged. Control now moves to block 394 of the flowchart of FIG. 3B.

Block 394 of the flowchart initiates a merge of the child elements, with associated attribute, of the matching elements $M_A$ and $M_B$. For the execution of this block the matching elements $M_A$ and $M_B$ i.e., book id="bk102" of Book_dup1.xml and book id="bk102" of Book_dup2.xml are the parent elements. Only those child elements (of parent elements $M_A$ and $M_B$) that have an associated attribute are merged at this block. The merging of the child elements of matching parent elements is similar to the merging of the parent elements as discussed above from block 305 onwards. Since there are no child elements of these parent elements $M_A$ and $M_B$ of Book_dup2.xml and Book_dup1.xml the flowchart moves to block 396.

The flowchart at block 396 revises $C_B$, the list of child elements of B.xml remaining to be copied to A.xml in the copy operation as well as $C_A$, the list of remaining (uncompared) elements of A.xml. Block 397 determines whether there are any more child elements in $C_B$, and if yes, block 398 determines whether there are any more child elements in $C_A$. If there are child elements in $C_A$ as determined in block 398 then the flowchart moves back to block 380 with the revised list $C_A$ and $C_B$ of the child elements in A.xml and B.xml. If there are no child elements in $C_A$ as determined in block 398 then at block 399 the child elements in $C_B$ are inserted in A.xml as siblings to the child elements of A.xml. At block 399 all the attributes, text content and child elements of each of the remaining child elements of $C_B$ are also inserted in to the list $L_A$ of A.xml. Accordingly, the list $L_A$ is appended with all the child elements in list $C_B$. At block 397 if there is no more child elements in $C_B$ to be copied to A.xml then the flowchart ends.

With respect to FIG. 4B, at block 396 the revised list $C_B$ of Book_dup2.xml remaining to be copied to Book_dup1.xml in the copy operation includes book id="bk107" and the revised list $C_A$ of remaining uncompared child elements of Book_dup1.xml is empty. Accordingly the control moves to block 399 where the child element in $C_B$ i.e., book id="bk107" and its attributes and text content are inserted as sibling to the child elements of Book_dup1.xml". Accordingly, the updated list $L_A$ contains (book id="bk101", book id="bk102", book id="bk107"). After block 399 the flowchart ends.

FIG. 4B shows the merged output document Book_dup1.xml+Book_dup2.xml containing all the elements as in the updated list $L_A$.

FIG. 4D with input XML documents Book_com1.xml and Book_com2.xml being equivalent to A.xml and B.xml (210A and 210B) respectively, illustrates another example of two conflicting input XML documents that have duplicate elements. Book_com1.xml and Book_com2.xml are merged according to the comparison logic and merging operation illustrated in FIGS. 3A-3B. For this example, a merge property file 220B the contents of which are marked as 406 in FIG. 4D is used. According to the merge property file 406 the merge attribute for the child element named "book" is the "id" attribute.

At blocks 301 and 305 of the flowchart of FIG. 3A the root elements $R_A$ and $R_B$ and their list of child elements $L_A$ and $L_B$ of the input XML documents Book_com1.xml and Book_com2.xml are identified. The list $L_A$ of child elements of Book_com1.xml contains two "book" child elements $L_A$(book id="bk101", book id="bk102") where, first book child element $L_A(1)$ has an associated attribute id="bk101" and second book child element $L_A(2)$ has an associated attribute id="bk102". The list $L_B$ of child elements of Book_com2.xml has three "book" child elements $L_B$(book id="bk102", book id="bk107", book id="bk101") where, first book child element $L_A(1)$ has an associated attribute id="bk102", a second book child element $L_A(2)$ has an associated attribute id="107" and a third book child element $L_A(3)$ has an associated attribute id="101".

Block 306 of FIG. 3A checks whether there are any child elements in Book_com2.xml, or if list $L_B$ is null. Since the list $L_B$ is not null the flowchart progresses to block 307.

Block 307 of FIG. 3A checks whether there are any child elements in the list $L_A$ of Book_com1.xml. Since the list $L_A$ is not null the flowchart progresses to block 310.

At block 310 of the flowchart of FIG. 3A, the first child element $L_A(1)$ of Book_com1.xml is identified as "book" with an associated attribute id ="bk101" and the first child element $L_B(1)$ of Book_com2.xml is identified as "book" with an associated attribute id="bk102".

At block 315 of the flowchart of FIG. 3A, the first child element of Book_com1.xml is compared, based on the merge attribute 406, with all the child elements of Book_com2.xml starting from the first child element of Book_com2.xml. Accordingly, the first child element $L_A(1)$ of Book_com1.xml i.e., book id="bk101" is compared with all the child elements in the list $L_B$ of Book_com2.xml starting from $L_B(1)$ up to the last element $L_B(m)$ or until a match is found.

Block 320 of the flowchart of FIG. 3A determines whether any of the child elements of Book_com2.xml with their associated ID-type attribute matches with the first child element $L_A(1)$ i.e., book id="bk101" of Book_com1.xml. The third child element, $L_B(3)$ of Book_com2.xml is book id="bk101" and has the merge attribute value equal to that of $L_A(1)$. Therefore, $L_A(1)$ of Book_com1.xml matches with $L_B(3)$, and the flowchart moves to block 330.

For the sake of convenience, in the following sections of FIG. 4D, the matched child element in Book_com1.xml is temporarily denoted as $D_A$ and the matched child element in Book_com2.xml is temporarily denoted as $D_B$, where $D_A=L_A(1)$ and $D_B=L_B(3)$. Block 330 initiates a copy operation of select child elements in the list $L_B$ of Book_com2.xml to Book_com1.xml as sibling to the child elements of Book_com1.xml. The child elements in the list $L_B$ selected for the copy operation start from the first child element $L_B(1)$ up to one child element before the matched child element $D_B$ namely, from $L_B(1)$ to $L_B(2)$ i.e., (book id="bk102", book id="bk107"). The copy operation of block 330 is similar to that illustrated in FIG. 3B. For the sake of clarity, the copy operation of block 330 has been described below with respect to the flowchart of FIG. 3B beginning from block 380.

9. Copy Operation

At block 380 the copy operation begins with information from block 330 identifying the list of child elements of Book_com2.xml selected for the copy operation namely, $L_B(1)$ and $L_B(2)$, and the list of remaining child elements of Book_com1.xml namely, $L_A(2)$ to $L_A(n)$. The list of child elements of Book_com2.xml selected for the copy operation is stored in list $C_B$ and the list of remaining child elements of Book_com1.xml, is stored in the list $C_A$. Accordingly, $C_B$ contains (book id="bk102", book id="bk107"), and $C_A$ contains (book id="bk102"). This copy operation is similar to the copy operation described above with respect to the example of FIGS. 4A and 4B. At blocks 384 and 392, duplicate elements are found in Book_com2.xml and Book_com1.xml at $C_B(1)$ and $C_A(1)$ respectively. At block 386, since $C_B(2)$ has no match in Book_com1.xml, $C_B(2)$ is appended to the list $L_A$ of Book_com1.xml, inserting $C_B(2)$ along with all its attributes, text content and child elements to Book_com1.xml as sibling to the child elements of Book_com1.xml. At the end of the copy operation the updated list $L_A$ contains (book id="bk101", book id="bk102", book id="bk107"). After the copy operation of block 330 the control moves to block 335.

The execution of block 335 for FIG. 4D is as described above with respect to the execution of block 392 for FIG. 4B. Block 335 compares all the attributes and text content, if any, of the matching child elements of $D_A$ and $D_B$ of A.xml and B.xml identified in blocks 315 and 320 above. Accordingly, all the attributes and text content of the matched child element $D_A$ i.e., book id="bk101" of Book_com2.xml are compared with those of the matched child element $D_B$ i.e., book id="bk101" of Book_com1.xml. Since there are no additional attributes in the child elements of the XML documents of FIG. 4D and the text content of the matching child elements of the two XML documents are equal the matched child element $D_A$ of Book_com1.xml remains unchanged and $D_B$ is not inserted to Book_com1.xml. At the end of block 335 the updated list $L_A$ contains (book id="bk101", book id="bk102", book id="bk107").

Block 340 merges the child elements of the matching (parent) elements $D_A$ and $D_B$ identified in steps 320 and 330 above. Only the child elements that have an associated attribute are merged at this block. The comparison and merging operation of block 340 is similar to that of the parent elements $D_A$ and $D_B$ beginning from block 305 with the list of child elements $L_A$ and $L_B$ being the list of child elements of $D_A$ and $D_B$ respectively and $D_A$ and $D_B$ being the root elements. For the execution of this block, the matching elements $D_B$, book id="bk101" of Book_com2.xml and $D_A$, book id="bk101" of Book_com1.xml are the parent elements and since they do not have any child elements the control moves to block 345.

Block 345 initiates merging of the remaining child elements of A.xml with the remaining child elements of B.xml. The remaining child elements of B.xml start from one child element after the matched child element identified in block 320 as $D_B=L_B(3)$ (book id="bk101" of Book_com2.xml) to the last child element of B.xml $L_B(m)$ i.e., from $L_B(3+1)$ to $L_B(m)$. Both the lists $L_A$ and $L_B$ of A.xml and B.xml, respectively, are revised to reflect the list of remaining child elements to be compared and merged. As shown using connector A in FIG. 3A, this merging operation begins from block 305 of the flowchart with the revised lists $L_A$ and $L_B$. Since there are no more child elements in Book_com2.xml after $D_B$ or $L_B(3)$ the flowchart ends after block 306.

FIG. 4D illustrates the merged output document Book_com2.xml containing all the elements as in the updated list $L_A$.

10. Merging Elements with Content Revision

Figure 4C:
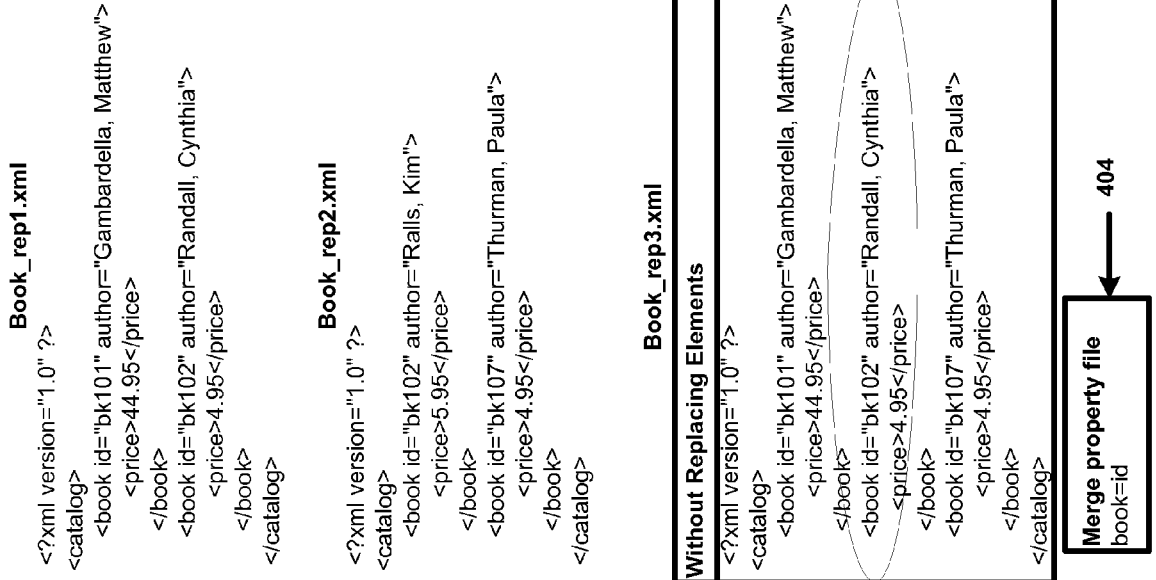

FIG. 4C illustrates two input XML documents Book_rep1.xml and Book_rep2.xml. The merging of these two XML documents using the comparison logic and merging operation of FIGS. 3A-3B is similar to the merging of the XML documents illustrated in FIG. 4B with the exception of the execution of block 392 of FIG. 3B. In FIG. 4C the matching child elements $M_A$ and $M_B$ of Book_rep1.xml and Book_rep2.xml are $L_A(2)$ and $L_B(1)$ respectively. The attributes associated with the matching child elements $M_A$ and $M_B$ and their text content are not equal. The additional attribute of each of the matching child elements $M_A$ and $M_B$ is "author" and the text content is "price". At block 392 of the flowchart of FIG. 3B, the attribute values and text content of $M_A$ and $M_B$ are string compared and identified as not equal. Therefore, based on the value of the replace flag the contents of the matching child elements of either of the input documents are retained in the merged output. If the replace flag is set to "false" then $M_A$ of Book_rep1.xml is selected and the attributes and text contents of $M_A$ is retained in the merged output XML. The merged output XML Book_rep3.xml for replace flag set to "false" is illustrated in FIG. 4C. Book_rep4.xml in FIG. 4C illustrates a merged output XML document with the replace flag set to "true" thereby selecting $M_B$ of Book_rep2.xml and copying the attributes and text contents of $M_B$ to the merged output XML.

11. Merging Child Elements of the Matched Elements

FIG. 4E illustrates a scenario that involves merging of the child elements (child elements with associated attribute) of matching (parent) elements where the matching (parent) elements are identified using the comparison logic of FIGS. 3A-3B as described above with respect to FIGS. 4A and 4B.

FIG. 4E shows input XML documents Emp_child1.xml and Emp_child2.xml with the "Employees" element having a child element named "Employee". The "Employee" child element has a merge attribute "EmployeeID" (marked as 408 in FIG. 4E). From the flowchart of FIG. 3A, at block 315 and 320 it is determined that the child elements "Employee" of the two input XML documents have their merge attribute "EmployeeID" equal in value="emp1". This is followed by execution of block 330 that initiates a copy of all child elements of Emp_child2.xml from the first child element up to one child element before the matched child element to Book_child1.xml. These child elements of Book_emp2.xml are copied as sibling to the child elements of Emp_child1.xml. However, since the matched child element of Emp_child2.xml is the first child element of Emp_child2.xml there is no copy operation to be executed in block 330 and the control flows to block 335. Execution of block 335 is similar to the execution of block 392 of FIG. 3B described above with respect to the example of FIG. 4B. The control now moves to block 340.

Block 340 of FIG. 3A merges the child elements of matching (parent) elements, when the child elements themselves have associated attributes. For the execution of this block the matching child elements "Employee" in Emp_child1.xml and Emp_child2.xml are now the parent elements and have a child element "Address" with an associated ID attribute. This child element "Address" will be merged in block 340. The merging of the "Address" child element is similar to that of the parent elements as described above. The comparison and merging of the "Address" child element also involves, at block 315, comparison of the merge attribute value of the "Address" child element in Emp_child1.xml with that of the "Address" child element in Emp_child2.xml. The merge attribute for "Address" child element is the "id" attribute marked as 408 in FIG. 4E. Based on the comparison, at block 320 it is determined that the child element "Address.id" of "Employee" in Emp_child1.xml is not equal to the "Address.id" of "Employee" in Emp_child2.xml and hence no match is found. At block 325 the child element "Address.id=present" of Emp_child2.xml will be copied to Emp_child1.xml as sibling to the child element "Address.id=permanent" of Emp_child1.xml. FIG. 4E illustrates the merged output document Emp_child1.xml+ Emp_child2.xml that includes both "Address.id" child elements "Address.id=present" and "Address.id=permanent". For child elements having equal attribute values only one copy of that child element will be retained in the merged output document as described in blocks 320 to 335 of FIG. 3A.

12. Element-Based Static Merge Attribute

FIG. 4F illustrates two input XML documents org1.xml and org2.xml that are merged according to the comparison logic and merging operation of FIGS. 3A-3B using the merge attributes 410 of the property file 220B. According to an embodiment of the present invention, the user of the computing system 110B may configure the merge attributes in the property file 220B such that different elements may be merged based on different merge attributes. For example, with respect to FIG. 4F, the user has configured that the element "Department" be merged using "DepartmentID" as the merge attribute and the element "Employee" be merged using "EmployeeID" as the merge attribute. As described above the comparison logic 220A compares elements based on the property file 220B to identify the merge attributes configured by the user, this enables the comparison operation to compare elements using the corresponding merge attribute as configured in the property file 220B.

13. Merging with Multiple Merge Attributes

FIG. 4G illustrates an example of two input XML documents that are merged using the comparison logic and merging operation of FIGS. 3A-3B where the elements of EmployeeList1.xml are compared with the elements of EmployeeList2.xml based on more than one merge attribute as configured in the property file and listed in FIG. 4G at 412. According to the property file 412, the "Employee" child element is merged based on the following attributes associated with it: EmployeeID, EmployeeName, DepartmentID. A child element of EmployeeList1.xml is said to match with another child element of EmployeeList2.xml or vice versa when their respective values of all the merge attributes, EmployeeID, EmployeeName, DepartmentID, are equal in value. The order of the merge attributes 412 in the property file determines the priority with which the merge attributes may be considered for comparison. In FIG. 4G, attributes EmployeeID and DepartmentID of the first Employee child element of EmployeeList1.xml and the second Employee child element of EmployeeList2.xml are equal in values; EmployeeID="emp1" and DepartmentID="Development". However, the third merge attribute EmployeeName is not equal: for EmployeeList1.xml "Employee" child element EmployeeName="Alex" and for EmployeeList2.xml "Employee" child element EmployeeName="Jacob". The remaining child elements of EmployeeList1.xml and EmployeeList2.xml also do not match since their merge attribute values are unequal. Therefore, the child elements of EmployeeList1.xml and EmployeeList2.xml do not match and as illustrated in FIG. 4G, the merged output document includes all the child elements of both the input XML documents.

14. Configuring Merge Attributes with XML Namespace Definition

Elements with similar names may be present in different XML namespaces (http://www.w3.org/TR/xml-names/) and the merge utility 220 is capable of identifying whether elements being compared belong to the same XML namespace. In order to ensure that the comparison logic 220A compares elements of the same XML document type, an embodiment of the present invention enables configuring the merge attributes in the property file 220B using the XML namespace definition. For example, in FIG. 4G described above, the property file may list the merge attribute 412 with the namespace for the XML elements included as: http\://oracle.com/Organization+Employee=EmployeeID. Accordingly, the comparison logic 220A will compare the elements of the two input XML documents only if their namespace definitions are equal to that specified for the element in the property file. If the XML namespaces of the elements of the two XML documents to be compared do not match then the attribute comparison for those elements will be ignored.

15. Merging Non-Matching Elements with Duplicate Id-Type Attribute

FIG. 4H illustrates two example input XML documents Emp_guid1.xml and Emp_guid2.xml that are merged using the comparison logic and merging operation of FIGS. 3A-3B, as described above with respect to FIGS. 4A through 4G. The "Employee" child elements of the input XML documents of FIG. 4H are merged based on the "EmployeeName" merge attribute 416 in FIG. 4H. Since the "EmployeeName" merge attributes of the "Employee" child element of Emp_guid1.xml is not equal to that of the "Employee" child element of Emp_guid2.xml, no match is found. However, the ID-type attributes of the two "Employee" child elements are equal indicating duplicate "EmployeeID" for two "Employee" child elements that are themselves non-matching. In other words, two employees "Jacob" and "Krish" have the same EmployeeID. In such case validation of the merged output document using XSD, 420 in FIG. 4H, may fail or may generate a duplicate ID exception when parsed. According to an embodiment of the present invention, when child elements of two input XML documents are merged using merge attributes other than the ID-type attribute and when conflict arises due to the ID-type attributes of the two child elements being equal in value, a global unique identifier (GUID) number is generated for the ID-type attribute of one of the child elements to distinguish it from the other child element in the merged output XML document. As shown in FIG. 4H, a GUID is generated for the "EmployeeID" of the "Employee" child element of Emp_guid2.xml marked as 418 in the merged output XML document in FIG. 4H. The GUID is unique for the XML document.

16. Merging with XSD Enablement

According to another embodiment of the present invention the merge utility 220 enables merging the XML documents with inputs from the XSD of the input XML documents. The merge utility 220 generates merged output XML document with the sequence of the elements of the merged document in accordance with the sequence in the XSD. The merged output XML document may also be validated against the XSD.

FIG. 4I illustrates an example where the XSD, Emp_xsd.xsd of the input XML documents is available as an input to the merge utility 220. The two input XML documents Emp_xsd1.xml and Emp_xsd2.xml are merged using the comparison logic and merging operation of FIGS. 3A-3B and is similar to the operation described above with respect to FIG. 4A where none of the child elements of the input XML documents match. Accordingly, at block 325 all the child elements of Emp_xsd2.xml are copied to Emp_xsd1.xml as siblings to the child elements of Emp_xsd1.xml. If the merge utility 220 merges the two input XML documents without the XSD enablement then the sequence of the child elements in the merged output XML document would be first child element "Department.DepartmentID=HR", second child element "Employee.EmployeeName=Krish" and third child element "Department.DepartmentID=sales". This sequence is similar to that described with respect to FIG. 4A and is based on the order in which the elements are copied to the merged output XML document. On the other hand, if the merge utility 220 merges the two input XML documents with XSD enablement then the sequence of the elements in the merged output XML document will be determined by the sequence of the elements in the XSD file and the merged output XML document Emp_xsd1.xml+Emp_xsd2.xml is as shown in FIG. 4I.

Another embodiment of the present invention provides application programming interfaces (API) for comparing two or more XML documents, and for merging two or more XML documents. Such API's may be called by a requesting system to initiate a comparison operation or a merge operation for two or more XML documents. Such an embodiment of the present invention may be operative in the environment of FIG. 1 comprising of computing system 110B and computing system 110A in a client-server environment. According to such an embodiment of the present invention the computing system 110B may invoke the services of the API's of the merge utility 220 of the computing system 110A. The XML documents to be compared or merged may be stored in the storage system 120 of the computing system 110A or may be external to the computing system 110A in which case the locations of the XML documents may be provided to the merge utility 220 using relevant interfaces. In an example embodiment, the computing system 110B may invoke one of the interfaces provided by the merge utility 220 that compares two XML documents without actually merging the two XML documents. Such a feature is desirable when, for example, a user of the computing system 110B is interested in only knowing the similarities or differences in data in two XML documents and not in the merged output XML document. In response to such a request the merge utility 220 may request the computing system 110B to provide the merge attributes or assume a default merge attribute for the comparison. During the comparison of the two XML documents according to the flowchart of FIGS. 3A-3B several events may be generated corresponding to the result of execution of the comparison logic of the flowchart. No merge operation corresponding to the copy or insert operations of blocks 308, 325, 330, 386, 392, 399, etc is initiated when the request is to compare two XML documents. The events generated inform the user of the computing system 110B of the results of the element comparison enabling the user to take further actions as desired. According to an embodiment of the present invention further actions from the user may also include providing feedback to the merge utility 220 to initiate the merging operation. Such features may be implemented in the merge utility 220 using a listener invocation approach such as is well known in Java™ implementations. Examples of various events that may be generated from the execution of the blocks of the flowchart of FIGS. 3A-3B, according to this embodiment of the present invention are:

a. At block 306 and 397, indicating that second XML document (B.xml) is null
b. At block 307 and 398 indicating that first XML document (A.xml) is null
c. At block 320 and 384, indicating whether the elements compared at block 315 and 382 respectively are EQUAL or UNEQUAL, optionally, with an indication of the elements compared
d. At block 335 and 392, indicating that the contents (additional attributes and child elements including PCDATA) of the matched elements are UNEQUAL.

As described above, another embodiment of the present invention enables the user of the requesting computing system 110B to provide a feedback based on which the merge operation corresponding to the copy or insert operations of blocks 308, 325, 330, 386, 392, 399, etc may be initiated. For example, at block 335 and 392 of the FIGS. 3A-3B, when an event is generated indicating that the contents of the matched elements are UNEQUAL, the merge utility 220 may request user's feedback on the value of the replace flag and accordingly merge the input XML documents. According to another example embodiment, the merge utility 220 enables the user of the requesting computing system 110B to dynamically configure the merge attributes instead of statically configuring the merge attributes in the property file 220B. With respect to the embodiment of the dynamic merge attribute, before initiating a comparison for each of the elements of the XML documents the merge utility 220 may request the user to provide one or more merge attributes to be used for the comparison (and subsequent merging) of that element. Such merging of XML documents using dynamic merge attributes has an additional advantage over the merging of XML documents using static merge attributes described earlier. Dynamic merge attributes enable the user to provide different merge attributes for similar-named elements. For example, with respect to FIG. 4H, the element with "Departments" tag has two entries for Department, each entry can be merged using a different merge attribute. For example, with respect to org1.xml, the user can configure the first element of "Departments" i.e., Department.DepartmentID="Development" to be merged using DepartmentID as the merge attribute and the second element Department.DepartmentID="HR" to be merged using DepartmentName as the merge attribute.

The flowcharts of FIGS. 3A-3B describe a specific technique for comparing and merging two input XML documents based on their merge attributes to generate a single merged XML document. However, the flowcharts of FIGS. 3A-3B do not in any way limit the scope of the present invention to this specific technique described in the steps of the flowcharts. Any modifications in the steps or the sequence of steps of the flowcharts of FIGS. 3A-3B that would still enable the comparison of the elements of the input XML documents to identify conflicts and resolve conflicts are foreseeable by the teachings of the present invention. For example, prior to initiating the comparison operation a sorting technique may be employed that sorts the elements of each of the input XML documents based on the values of their merge attributes (when the values of the merge attributes involve numerals) thereby reducing the number of comparison operations required. Although, the embodiments of the present invention have been described with respect to certain contents of the XML document such as elements, attributes, text content, etc, the teachings of the present invention can be extended to other contents of the XML document.

17. Digital Processing System

Figure 5:
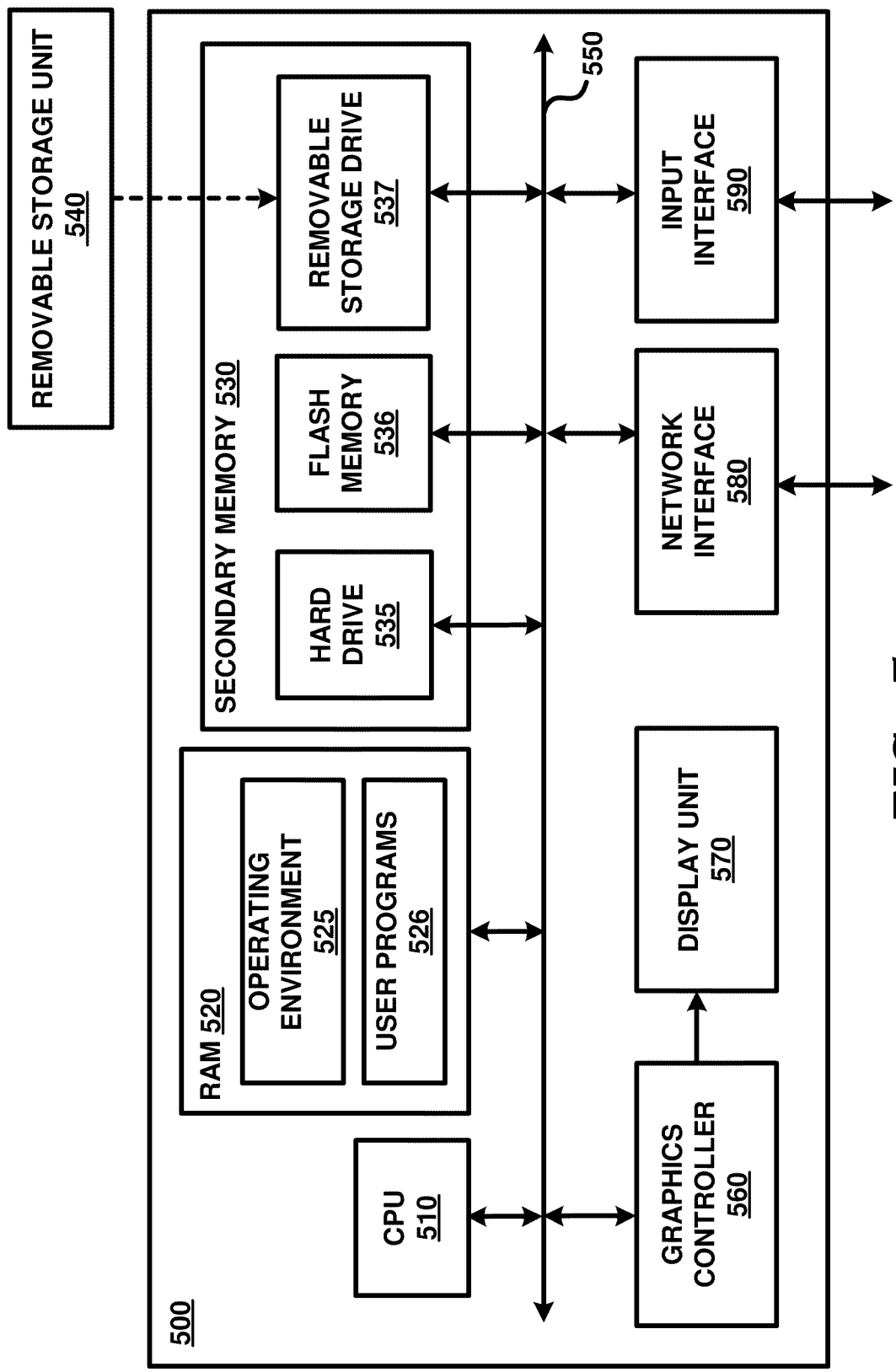
FIG. 5 is a block diagram illustrating the details of digital processing system in which various aspects of the present invention are operative by execution of appropriate software instructions.

FIG. 5 is a block diagram illustrating the details of digital processing system 500 in which various aspects of the present invention are operative by execution of appropriate software instructions. Digital processing system 500 may correspond to any system (such as computing systems 110A and 110B).

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs.

Network interface 580 provides connectivity to a network (e.g., using Internet Protocol), and may be used to communicate with other connected systems (such as computing systems 110A-110B) of FIG. 1.

Secondary memory 530 may contain hard drive 535, flash memory 536, and removable storage drive 537. Secondary memory 530 may store the data (such as data stored in the secondary storage of FIG. 2) and software instructions (such as portions of code corresponding to the comparison logic and merging operations of FIGS. 3A-3B), which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

18. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for automatically merging data contained in a first XML document and data contained in a second XML document, the method comprising:
   identifying a merge attribute, wherein said merger attribute is an XML attribute that exists in both the first XML document and the second XML document;
   performing a set of comparisons, each comparison of the set of comparisons comparing an element of a set of elements of the first XML document with an element of a set of elements of the second XML document,
   wherein the comparison is based on the merge attribute, the merge attribute being contained in each of the elements of the set of elements of the first XML document and the second XML document,
   wherein a first comparison of the set of comparisons involves comparing the value of the merge attribute of a first element of the set of elements of the first XML document with that of the merge attribute of each element of the set of elements of the second XML document; and
   determining data from the first XML document and data from the second XML document to be included in a merged XML document, wherein said determining is based on the results of the set of comparisons, including said first comparison; and
   generating a merged XML document based on the determining, wherein said merged XML document contains only one of said first element and a second element of said XML document if the value of the merge attribute of said first element is equal to the value of the merge attribute of the second element of said second XML document.

2. The method of claim 1, wherein in each comparison, the elements of the set of elements of the first XML document and of the second XML document being compared match when their respective values for their merge attribute are equal.

3. The method of claim 2, further comprising, initiating a copy operation of the unmatched elements of the second XML document to the first XML document, wherein a third element of the second XML document is determined to be an unmatched element if the value of the merge attribute of the third element is determined to not equal the value of the merge attribute of any of the set of elements of the first document.

4. The method of claim 3, wherein, the copy operation comprises a second set of comparisons of the set of comparisons, the second set of comparisons comprising comparison of the unmatched elements of the second XML document with all the elements of the first XML document excluding the first element considered in the set of comparisons.

5. The method of claim 2, further comprising, comparison of the child elements of the matching elements of the first XML document and the second XML document.

6. The method of claim 5, further comprising:
comparison of other attributes, and text content of the matching elements;
determining based on the value of a replace flag, a selected element of the matching elements, when the attributes or text content or both of the matching elements are determined as unequal; and
copying the attributes, and text content of the selected element to the merged XML document.

7. The method of claim 1, further comprising:
parsing the first XML document and second XML document to generate the list of attributes;
sending the list of attributes to a requesting system; and
receiving from the requesting system the merge attribute selected from the list of attributes.

8. The method of claim 7, further comprising specifying, for the merge attribute, the XML namespace definition for the element associated with the merge attribute.

9. The method of claim 7, wherein, a second comparison of the set of comparisons is based on a second merge attribute as selected by the requesting system, wherein the second merge attribute is different from the merge attribute and is associated with the elements of the first XML document and the second XML document being compared in the second comparison, and wherein the second merge attribute is defined to be of type xml:ID in the schema.

10. The method of claim 9 further comprising, sequencing the order of the elements in the merged XML document in accordance with an XSD document.

11. The method of claim 1, wherein the merge attribute is dynamically selected by a requesting system for each comparison of the set of comparisons.

12. The method of claim 1, wherein the determining comprises determining and resolving conflicts and duplicates in the first XML document and the second XML document, and wherein said merge attribute is defined as type xml:id in a schema associated with the first XML document.

13. The method of claim 12, further comprising, generating in the merged XML document a unique identifier for an ID-type attribute of an element in the merged XML document, when the one or more conflicts is a conflict between two unmatched elements having unequal values for the merge attribute but having equal values for other ID-type attributes of the unmatched elements.

14. The method of claim 1, further comprising, generating one or more events corresponding to each comparison of the set of comparisons.

15. The method of claim 1 further comprising, in response to finding equality of the merge attribute of said first element with that of said second element in the first comparison, comparing sub-elements of the first element with sub-elements of said second element of the set of elements of the second XML document.

16. The method of claim 1 wherein the element of the set of elements of the first XML document and the element of the set of elements of the second XML document comprises one or more of Parsed Character Data (PCDATA), other attributes, or child elements.

17. The method of claim 1 wherein the first XML document and the second XML document have same local names.

18. The method of claim 1 wherein the identifying the merge attribute comprises using an interface to identify, from the list of attributes, attributes with the string "ID" in the attribute name.

19. A digital processing system for comparing a first XML document with a second XML document, said digital processing system comprising:
at least a memory and a processor and capable of executing software instructions performing the operations of:
receiving from a client system across a network, a request to compare the first XML document with the second XML document;
parsing the first XML document and the second XML document;
generating a list of attributes in the first XML document and the second XML document;
identifying from the list of attributes, one merge attribute which is an XML attribute that exists in both the first XML document and the second XML document;
performing a set of comparisons, each comparison of the set of comparisons comparing an element of a set of elements of the first XML document with an element of a set of elements of the second XML document;
wherein the comparison is based on the merge attribute, the merge attribute being contained in each of the elements of the set of elements of the first XML document and the second XML document,
wherein a first comparison of the set of comparisons involves comparing the value of the merge attribute of a first element of the set of elements of the first XML document with that of the merge attribute of each element of the set of elements of the second XML document;
determining data from the first XML document and data from the second XML document to be included in a merged XML document, wherein said determining is based on the results of the set of comparisons, including said first comparison; and
generating a merged XML document based on the determining, wherein said merged XML document contains only one of said first element and a second element of said XML document if the value of the merge attribute of said first element is equal to the value of the merge attribute of the second element of said second XML document.

20. A non-transitory computer readable storage medium storing instructions executable by a processor, wherein execution of the instructions by the processor cause the processor to automatically merge data contained in a first XML document and data contained in a second XML document, the instructions comprising instructions to:
identify a merge attribute, wherein said merger attribute is an XML attribute that exists in both the first XML document and the second XML document;
perform a set of comparisons, each comparison of the set of comparisons comparing an element of a set of elements of the first XML document with an element of a set of elements of the second XML document,
wherein the comparison is based on the merge attribute, the merge attribute being contained in each of the elements of the set of elements of the first XML document and the second XML document,
wherein a first comparison of the set of comparisons involves comparing the value of the merge attribute of a first element of the set of elements of the first XML document with that of the merge attribute of each element of the set of elements of the second XML document; and determine data from the first XML document and data from the second XML document to be included in a merged XML document, wherein said determining is based on the results of the set of comparisons, including said first comparison; and generate a merged XML document based on the determining, wherein said merged XML document contains only one of said first element and a second element of said XML document if the value of the merge attribute of said first element is equal to the value of the merge attribute of the second element of said second XML document.

21. A method of merging data containing XML documents, said method comprising:

receiving a first XML document and a second XML document, said first XML document containing a first plurality of elements and said second XML document containing a second plurality of elements, wherein each of said first plurality of elements and said second plurality of elements have a same identifier, each of said first plurality of elements and said second plurality of elements having a corresponding set of attributes, with each attribute having an associated value;

receiving a merge attribute for merging said first plurality of elements with said second plurality of elements, wherein said merge attribute is an XML attribute and is present in the set of attributes corresponding to all of said first plurality of elements and said second plurality of elements;

comparing a first element of said first plurality of elements with a second element of a second plurality of elements, wherein said comparing checks whether a first value of said merge attribute in said first element equals a second value of said merge attribute in said second element;

forming a merged XML document of said first XML document and said second XML document, wherein if said comparing determines that said first value equals said second value, said forming includes in said merged XML document a single element as a result of processing of said first element and said second element, and otherwise, said forming to include two elements corresponding respectively to said first element and said second element.

22. The method of claim 21, wherein each of said first plurality of elements and said second plurality of elements contains a corresponding set of child elements, wherein said first element contains a first set of child elements and said second element contains a second set of child elements, wherein said single element comprises a merged set of elements formed based on said first set of child elements and said second set of child elements, wherein said forming decides to include said single element or said two elements solely based on said comparing of said first value and said second value, without having to examine said first set of child elements and said second set of child elements for equality.

23. The method of claim 22, wherein said merge attribute is identified from user specified inputs without having to examine said first plurality of elements and said second plurality of elements.

24. The method of claim 23, further comprising receiving a merge property file from a user, wherein said merge property file indicates an attribute identifier that uniquely identifies said merge attribute in said first plurality of elements and said second plurality of elements, wherein said comparing checks whether said first value of said merge attribute in said first element equals said second value of said merge attribute in said second element, in response to receiving of said attribute identifier in said merge property file.

25. The method of claim 23, wherein a schema file common to both said first XML document and said second XML document is provided by said user, wherein said merge attribute is defined to be of type xml:id in said schema, wherein said receiving receives said schema and examines said schema to identify said merge attribute based on said type.

26. The method of claim 22, wherein said first value equals said second value, and wherein the first set of child elements are not identical to said second set of child elements such that there are conflicting elements, said method further comprising resolving a conflict presented by said conflicting elements.

27. The method of claim 26, wherein said resolving comprising examining a value of a replace flag, and selecting the conflicting elements of said first set of child elements instead of those in said second set of child elements if said value of the replace flag is of a first value, and selecting the conflicting elements of said second set of elements instead of those in said first set of elements otherwise.

28. The method of claim 26, wherein said resolving comprises:

receiving a name of a sub-element as a second merge attribute; and including both a first sub-element of said first set of child elements and a second sub-element of said second set of child elements in said merged XML document in view of receiving of said second merge attribute, when the first sub-element and the second sub-element have said name, but have different values.

* * * * *

UNITED STATES PATENT AND TRADEMARK OFFICE
CERTIFICATE OF CORRECTION

PATENT NO. : 8,543,619 B2  
APPLICATION NO. : 12/559512  
DATED : September 24, 2013  
INVENTOR(S) : Dharmalingam Page 1 of 1

It is certified that error appears in the above-identified patent and that said Letters Patent is hereby corrected as shown below:

On title page, column 2, item [57] under Abstract, line 11, delete "asscociated" and insert -- associated --, therefor.

In the Drawings

On sheet 11 of 14, in figure 4G, under Reference Numeral 412, line 3, delete "http\://" and insert -- http:// --, therefor.

In the Specification

In column 4, line 9, delete "asscociated" and insert -- associated --, therefor.

In column 18, line 3, delete "http\://" and insert -- http:// --, therefor.

Signed and Sealed this  
Eighteenth Day of February, 2014

Michelle K. Lee  
*Deputy Director of the United States Patent and Trademark Office*